United States Patent
Toyoda et al.

(10) Patent No.: US 9,664,278 B2
(45) Date of Patent: May 30, 2017

(54) CONTROL DEVICE FOR VEHICLE

(71) Applicant: TOYOTA JIDOSHA KABUSHIKI KAISHA, Toyota-shi, Aichi-ken (JP)

(72) Inventors: Mitsuhiro Toyoda, Miyoshi (JP); Hirofumi Nakada, Toyota (JP); Michio Yoshida, Susono (JP); Daisuke Inoue, Toyota (JP); Atsushi Ayabe, Toyota (JP); Motonori Kimura, Toyota (JP); Akira Hino, Toyota (JP); Hiroki Kondo, Miyoshi (JP); Kenji Matsuo, Toyota (JP); Takuro Shimazu, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/897,413

(22) PCT Filed: Jun. 12, 2013

(86) PCT No.: PCT/JP2013/066172
§ 371 (c)(1),
(2) Date: Dec. 10, 2015

(87) PCT Pub. No.: WO2014/199458
PCT Pub. Date: Dec. 18, 2014

(65) Prior Publication Data
US 2016/0131256 A1 May 12, 2016

(51) Int. Cl.
*F16H 61/70* (2006.01)
*F16H 37/02* (2006.01)
(Continued)

(52) U.S. Cl.
CPC ......... *F16H 61/702* (2013.01); *F16H 37/022* (2013.01); *F16H 37/0846* (2013.01);
(Continued)

(58) Field of Classification Search
None
See application file for complete search history.

(56) References Cited

U.S. PATENT DOCUMENTS 5,086,671 A * 2/1992 Oshidari ............... F16H 37/021
474/28

FOREIGN PATENT DOCUMENTS

| JP | S56-90155 A | 7/1981 |
| JP | S62-45455 U | 3/1987 |

(Continued)

*Primary Examiner* — Erin D Bishop
(74) *Attorney, Agent, or Firm* — Oliff PLC

(57) ABSTRACT

A control device for a vehicle includes a transmission mechanism capable of setting a fixed transmission gear ratio, a continuously variable transmission provided in parallel with the transmission mechanism, and a path switching mechanism for selectively blocking a torque transmission path that includes the transmission mechanism and that is configured to dampen vibration. The control device further includes a clutch mechanism where the continuously variable transmission and the transmission mechanism capable of setting constant transmission gear ratio are arranged in parallel between an input shaft and the output shaft, that selectively connects torque transmission path stretching from an internal combustion engine to drive wheels via transmission mechanism, and one clutch and other clutch are arranged in series, the other clutch is arranged on a relatively downstream side. A control unit is configured to engage one clutch in a case where torque is transmitted from the internal combustion engine to the drive wheels via the continuously variable transmission.

9 Claims, 25 Drawing Sheets

(51) Int. Cl.
*F16H 57/00* (2012.01)
*F16H 37/08* (2006.01)
*F16H 61/02* (2006.01)

(52) U.S. Cl.
CPC ..... *F16H 57/0006* (2013.01); *F16H 61/0204* (2013.01); *F16H 2037/026* (2013.01)

(56) References Cited

FOREIGN PATENT DOCUMENTS

| | | |
|---|---|---|
| JP | S62-63259 A | 3/1987 |
| JP | H02-240438 A | 9/1990 |
| JP | H07-317875 A | 12/1995 |
| JP | 2000-055177 A | 2/2000 |
| JP | 2005-267945 A | 9/2005 |
| JP | 2007-265846 A | 10/2007 |

* cited by examiner

FIG. 3

|  | C1 | C2 | D1 | B1 |
|---|---|---|---|---|
| STARTING | ON | OFF | ON | OFF |
| FORWARD TRAVEL | OFF | ON | (ON) | OFF |
| REVERSE TRAVEL | OFF | OFF | ON | ON |
| FIRST DISENGAGED STATE | OFF | (OFF) | ON | OFF |
| SECOND DISENGAGED STATE | ON | (OFF) | OFF | OFF |
| THIRD DISENGAGED STATE | OFF | (OFF) | OFF | OFF |

CONTROL DEVICE FOR VEHICLE

TECHNICAL FIELD

The invention relates to a control device for a vehicle that includes: plural torque transmission paths that are formed in parallel between an input shaft, to which torque output by a power source is transmitted, and an output shaft for outputting the torque to drive wheels; and a path switching mechanism for switching a path capable of transmitting the torque from one path to the other path.

BACKGROUND ART

A configuration of a vehicle that includes: a gear mechanism and a belt-type continuously variable transmission that are provided in parallel; and plural clutch mechanisms for switching a torque transmission path, which stretches from a power source to drive wheels, to a transmission path including a continuously variable transmission or to a transmission path including a transmission mechanism has been described in Japanese Utility Model Application Publication No. 62-45455 (JP 62-45455 U). The configuration described in JP 62-45455 U is configured to be able to switch the torque transmission path, which stretches from the power source to the drive wheels, to the path including the belt-type continuously variable transmission or to the path including the gear mechanism and set a neutral state by combinations of the clutch mechanisms in engaged states or in disengaged states.

By the way, it has been known to directly connect a torque transmission path between an internal combustion engine and drive wheels in a vehicle including the internal combustion engine as a power source, in order to improve fuel economy by reducing power loss. In this case, vibrations and noise, such as front-rear and up-down vibrations of the vehicle and booming noise in a vehicle cabin, are possibly generated due to a vibration that is generated by explosion of fuel in the internal combustion engine, that is, transmission of a vibration that is generated when the internal combustion engine outputs torque to the torque transmission path. For this reason, as configurations for damping the vibration that is transmitted to the torque transmission path, a configuration for transmitting the torque via a fluid, a configuration for making the vehicle run by setting a relatively high gear ratio (transmission gear ratio) in a directly-connected state and controlling a speed of the internal combustion engine in a high speed state, a configuration for arranging a damper (a vibration damping device) with relatively low rigidity in the torque transmission path, a configuration for providing inertial moment in the torque transmission path by an inertial mass body, such as by increasing a mass of a flywheel that is coupled to the internal combustion engine, and the like have been known.

However, in the configuration described in above-described JP 62-45455 U, while it is possible to suppress transmission of the vibration, which is generated when the internal combustion engine outputs the torque, to the torque transmission path by a fluid transmission device, transmission efficiency for transmitting the torque via the fluid is degraded. Supposedly, in the case where the speed of the internal combustion engine is increased so as to dampen the vibration transmitted to the torque transmission path, the internal combustion engine cannot be driven in an operation range where the fuel can be saved. Accordingly, while the vibration can be dampened, the fuel economy is possibly degraded. In addition, in the case where the mass of the flywheel is increased, the vibration transmitted to the torque transmission path can be dampened by the inertial moment of the flywheel. However, in conjunction with an increase in the mass of the flywheel, an inertial force in the torque transmission path is increased, and the fuel economy is thereby degraded. Furthermore, a powertrain is increased in size due to an increase in weight of the unit.

SUMMARY OF THE INVENTION

The invention has been made by focusing on the above technical problem, and therefore has a purpose of providing a control device for a vehicle that includes: a transmission mechanism capable of setting a fixed transmission gear ratio; a continuously variable transmission provided in parallel with the transmission mechanism; and a path switching mechanism for selectively blocking a torque transmission path that includes the transmission mechanism and that is configured to dampen a vibration by controlling actuation of the path switching mechanism in accordance with an operation state of the vehicle.

In order to achieve the above purpose, the invention is a control device for a vehicle that includes, between an input shaft to which the torque output by the internal combustion engine is transmitted and an output shaft for outputting the torque to the drive wheels : a continuously variable transmission; a transmission mechanism; and a clutch mechanism that selectively switches between a transmission path capable of transmitting torque from an internal combustion engine to drive wheels via the continuously variable transmission and a transmission path capable of transmitting the torque from the internal combustion engine to the drive wheels via the transmission mechanism, in which the clutch mechanism is configured to include one clutch and the other clutch that is provided in series with respect to the one clutch and is provided closer to the output shaft side than the one clutch and to block transmission of the torque to the drive wheels via the transmission mechanism in the case where at least either one of the one clutch and the other clutch is disengaged. The control device for a vehicle is characterized in that, in the case where the torque is transmitted from the internal combustion engine to the drive wheels via the continuously variable transmission, either one of the one clutch and the other clutch is engaged.

The invention is a control device for a vehicle in the above invention that is characterized in that, in the case where the torque is transmitted from the internal combustion engine to the drive wheels via the continuously variable transmission and a speed of the internal combustion engine is at most equal to a specified speed, either one of the one clutch and the other clutch is engaged.

The invention is a control device for a vehicle in the above invention that is characterized in that, in the case where the torque is transmitted from the internal combustion engine to the drive wheels via the continuously variable transmission and output torque of the internal combustion engine is at least equal to specified torque, either one of the one clutch and the other clutch is engaged.

The invention is a control device for a vehicle in the above invention that is characterized in that, in the case where the torque is transmitted from the internal combustion engine to the drive wheels via the continuously variable transmission and a throttle opening degree is at least equal to a specified throttle opening degree, either one of the one clutch and the other clutch is engaged.

The invention is a control device for a vehicle in the above invention that is characterized in that, in the case where the torque is transmitted from the internal combustion engine to the drive wheels via the continuously variable transmission and a transmission gear ratio by the continuously variable transmission is at most equal to a specified transmission gear ratio, either one of the one clutch and the other clutch is engaged.

The invention is a control device for a vehicle in the above invention that is characterized in that, in the case where the torque is transmitted from the internal combustion engine to the drive wheels via the continuously variable transmission and a vehicle speed is at most equal to a specified vehicle speed, either one of the one clutch and the other clutch is engaged.

The invention is a control device for a vehicle in the above invention that is characterized in that the transmission mechanism includes a speed reduction mechanism that has a gear train and a transmission gear ratio by the transmission mechanism is set to be a higher transmission gear ratio than a maximum transmission gear ratio that can be set by the continuously variable transmission.

The invention is a control device for a vehicle in the above invention that is characterized by further comprising a forward/reverse travel switching mechanism for switching a rotational direction of the torque that is input from the input shaft in a transmission path that includes the transmission mechanism between the input shaft and the output shaft, in that the forward/reverse travel switching mechanism includes a planetary gear unit that has plural rotation elements.

The invention is a control device for a vehicle in the above invention that is characterized in that the transmission mechanism includes a counter shaft that is provided in parallel with the input shaft and the output shaft, the forward/reverse travel switching mechanism is arranged on either one rotational shaft of the input shaft, the counter shaft, and the output shaft, and either one of the one clutch and the other clutch is configured to be arranged on the rotational shaft, on which the forward/reverse travel switching mechanism is arranged, and selectively couple a rotation element that integrally rotates with the rotational shaft and the other rotation element among the plural rotation elements.

The invention is a control device for a vehicle in the above invention that is characterized in that the one clutch includes a friction clutch and the other clutch includes a meshing-type clutch.

According to the invention, in the case where the torque is transmitted from the internal combustion engine to the drive wheels via the continuously variable transmission, the transmission mechanism is in a state that does not constitute the torque transmission path stretching from the internal combustion engine to the drive wheels and can rotate idle. The transmission mechanism is joined to the output shaft by the other clutch, and the transmission mechanism can function as a rotational inertia body. That is, the transmission mechanism, which is a functional mechanism for forming the torque transmission path, can be used as a functional mechanism for dampening a vibration. Accordingly, the vibration that is originated from the internal combustion engine and is transmitted to the torque transmission path including the continuously variable transmission can be dampened by inertial moment related to the transmission mechanism. Thus, noise, such as booming noise, generated by the vibration and a front-rear vibration and an up-down vibration of the vehicle can be suppressed.

Furthermore, according to the invention, the one clutch and the other clutch are arranged in series in the torque transmission path that includes the transmission mechanism. Thus, in order to block the transmission of the torque from the internal combustion engine to the drive wheels via the transmission path, at least either one of those clutches only needs to be disengaged. That is, even in the case where the torque is transmitted from the internal combustion engine to the drive wheels via the continuously variable transmission, either one of the one clutch and the other clutch can be actuated. Thus, the transmission mechanism can be coupled to the torque transmission path that stretches from the internal combustion engine to the drive wheels via the continuously variable transmission by engaging either one of the clutches. In particular, the transmission mechanism can be coupled such that the torque of the output shaft acts thereon.

Accordingly, either one of the clutches can be brought into an engaged state in accordance with an operation state in a case where the speed of the internal combustion engine becomes at most equal to the specified speed, a case where the output torque of the internal combustion engine becomes at least equal to the specified torque, a case where the transmission gear ratio by the continuously variable transmission is at most equal to the specified transmission gear ratio, or the like during a travel by the continuously variable transmission. That is, in the operation state where the vibration that is transmitted to the torque transmission path including the continuously variable transmission becomes relatively large, the vibration can effectively be dampened by an inertial force by the transmission mechanism that is coupled to the output shaft. In addition, in accordance with the operation state, the other clutch can be disengaged, so as to decouple the transmission mechanism from the output shaft. In this way, power loss that is caused by rotation of the output shaft with the transmission mechanism can be suppressed. In other words, the transmission mechanism is coupled to the output shaft in an operation range where the vibration originated from the internal combustion engine is relatively large as in the above-described operation state. On the other hand, in an operation range where the vibration is relatively small, the transmission mechanism can be controlled so as to be decoupled from the output shaft. That is, it is possible to dampen a torsional vibration and improve fuel economy by using the transmission mechanism as the rotational inertia body.

In addition, according to the invention, the transmission mechanism is constituted as the speed reduction mechanism in the torque transmission path that stretches from the internal combustion engine to the drive wheels. In other words, in the case where the torque transmission path that includes the transmission mechanism is seen in a direction from the output shaft toward the input shaft, the transmission mechanism is constituted as a speed increase mechanism. Accordingly, in the case where the transmission mechanism is coupled to the output shaft during the travel by the continuously variable transmission, the torque of the output shaft is applied to the transmission mechanism, and the transmission mechanism generates a speed increasing action from the output shaft side to the input shaft side. That is, the transmission gear ratio (a speed increase gear ratio) of the transmission mechanism in the case where the transmission path that includes the transmission mechanism is seen in the direction from the output shaft side toward the input shaft side has a small value. Thus, equivalent inertial moment that is related to the transmission mechanism and acts on the output shaft obtains a large value. In other words, the equivalent inertial moment that is based on the transmission gear ratio by the transmission mechanism can effectively be used as the inertial force that acts on the output shaft by using the transmission gear ratio (the speed reduction gear ratio) of the transmission mechanism that is constituted as the speed reduction mechanism in the torque transmission path stretching from the internal combustion engine to the drive wheels. In addition, there is no need to increase weight of a unit, such as the continuously variable transmission or the transmission mechanism, so as to increase the inertial moment that acts on the torque transmission path. Accordingly, the increase in size of the powertrain can be prevented.

Furthermore, according to the invention, the transmission path that includes the transmission mechanism includes the forward/reverse travel switching mechanism that is constructed of the planetary gear unit. Accordingly, the inertial moment by the forward/reverse travel switching mechanism can act on the output shaft by engaging the clutch that is arranged on the downstream side in the torque transmission path. The torsional vibration can also effectively be dampened by increasing equivalent inertial moment related to the output shaft. In addition, since the clutch on the downstream side is constructed of the meshing-type clutch, the inertial moment of the transmission mechanism can reliably act on the output shaft by meshing the clutch. Furthermore, a control structure for controlling actuation of the meshing-type clutch can be prevented from being complicated, and thus coupling or decoupling between the transmission mechanism and the output shaft can be controlled with the simple control structure.

BRIEF DESCRIPTION OF THE DRAWINGS

FIG. 3 is a table that collectively shows engaged states and disengaged states of each clutch mechanism and a brake mechanism in accordance with operation states of the vehicle.

MODES FOR CARRYING OUT THE INVENTION

A description will hereinafter be made on a control device for a vehicle according to the invention on the basis of specified examples. A vehicle as a target of the invention includes plural torque transmission paths that stretch from a power source to drive wheels. Those plural transmission paths include: a transmission path that includes a transmission mechanism capable of setting a fixed transmission gear ratio; and a transmission path that includes a continuously variable transmission capable of continuously changing the transmission gear ratio. Furthermore, the plural transmission paths are arranged in parallel between an input shaft, to which power output by the power source is input, and an output shaft for outputting the power to the drive wheels. Accordingly, the vehicle includes a path switching mechanism for switching the path capable of transmitting torque from one path to the other path. That is, it is configured to allow a vehicle to run in a state where any one of the plural paths is connected by the path switching mechanism including plural clutches in a manner capable of transmitting the torque between the power source and the drive wheels and the path other than the above path is blocked such that the torque is not transmitted between the power source and the drive wheels. Accordingly, the control device for a vehicle according to the invention is configured to control actuation of the path switching mechanism in accordance with an operation state of the vehicle and join a portion of the path, in which transmission of the torque between the power source and the drive wheels is blocked, to the transmission path that is connected in the manner capable of transmitting the torque between the power source and the drive wheels.

Figure 1:
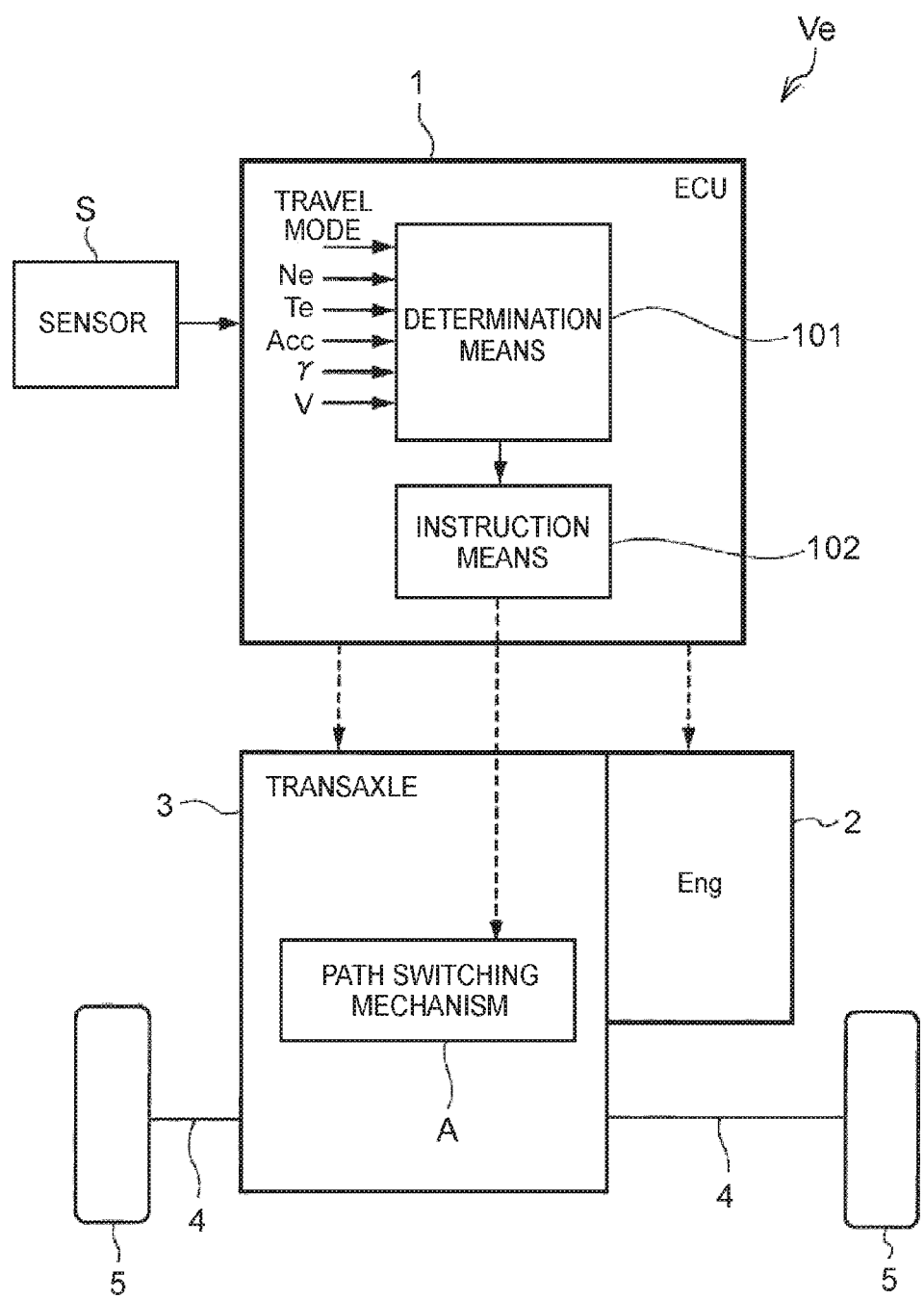
FIG. 1 is a block diagram that schematically shows a control device for a vehicle according to the invention and the vehicle in which the control device is mounted.

FIG. 1 schematically shows one example of the control device for a vehicle according to the invention and shows a vehicle in which the control device for a vehicle is mounted. As shown in FIG. 1, the control device for a vehicle in this specified example is included in an electronic control unit (hereinafter described as an "ECU") 1 that is mounted in a vehicle Ve, and is configured to control a powertrain that includes: an engine (Eng) 2 as a power source of the vehicle Ve; a transaxle 3 that transmits power output by the engine 2 toward drive wheels 5; and a drive shaft 4 that integrally rotates with the drive wheels 5. It should be noted that, in this description, the control device for a vehicle is described and explained as the ECU 1.

The ECU 1 is configured to include a controller for controlling the vehicle Ve and to also include a microcomputer that includes a central processing unit, a memory, and an input/output interface as main components. In addition, the ECU 1 is configured to receive various signals from various sensors S that are generated by detecting an operation state of the vehicle Ve. Furthermore, the memory of the ECU 1 is configured to store various types of data in addition to various control programs and to execute various types of arithmetic processing. Accordingly, the ECU 1 is configured to execute various types of the arithmetic processing on the basis of the received signals and the stored data and to output instruction signals for executing various types of control in accordance with the results of the arithmetic processing.

Meanwhile, the transaxle 3, which is shown in FIG. 1, includes a path switching mechanism A that selectively switches between a transmission path capable of transmitting torque from the engine 2 to the drive wheels 5 via a continuously variable transmission and a transmission path capable of transmitting the torque from the engine 2 to the drive wheels 5 via a transmission mechanism. That is, the powertrain, which can be the target of the invention, includes the plural torque transmission paths that stretch from the engine 2 to the drive wheels 5 and is configured that the path switching mechanism A connects either one of the paths in a manner capable of transmitting the torque. Accordingly, the ECU 1 is configured to control actuation of the path switching mechanism A in accordance with the operation state of the vehicle Ve.

Figure 2:
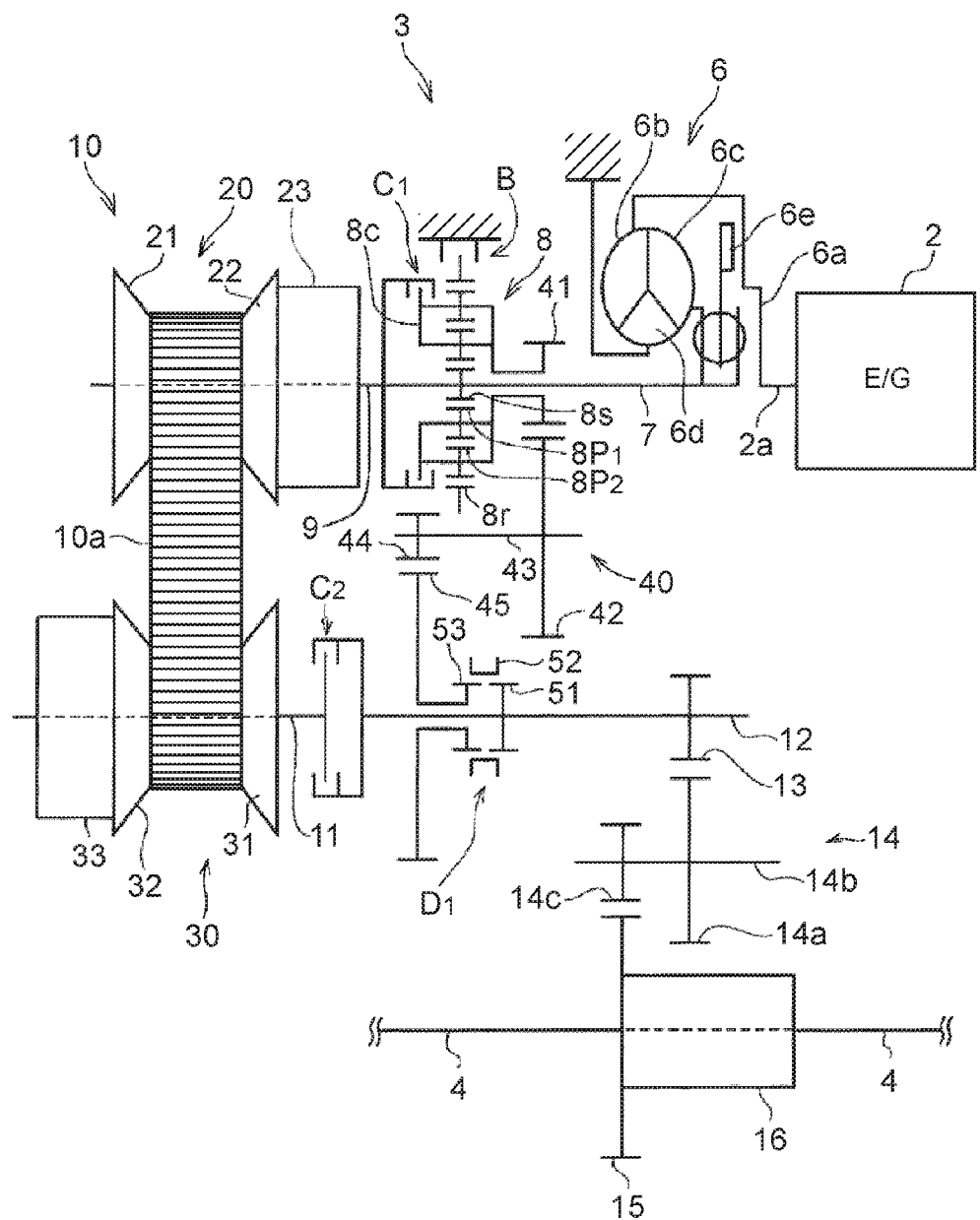
FIG. 2 is a skeletal view that shows a first specified example of a powertrain that can be a target of the invention.

Here, a first specified example of the powertrain that includes the path switching mechanism A is described by referring to FIG. 2. The powertrain in the first specified example includes a transmission path that includes a continuously variable transmission (hereinafter described as a "CVT") 10 capable of continuously varying a transmission gear ratio and a transmission path that includes a transmission mechanism 40 capable of setting a fixed transmission gear ratio as the torque transmission paths that stretch from the engine 2 to the drive wheels 5, and those transmission paths are provided in parallel. Accordingly, the transmission path that includes the CVT 10 may be described and explained as a "first transmission path", and the transmission path that includes the transmission mechanism 40 may be described and explained as a "second transmission path".

First, the torque transmission path that stretches from the engine 2 to the drive wheels 5 via the CVT 10, that is, the first transmission path will be described. The engine 2 includes a well-known structure and is any of a gasoline engine, a diesel engine, a hydrogen gas engine, a natural gas engine, and the like, for example, that is, an internal combustion engine that combusts fuel and outputs the power. The engine 2 is configured to change a fuel consumption amount or a fuel consumption rate in accordance with an engine speed Ne or engine torque Te. In addition, driving of the engine 2 is controlled by the ECU 1, and the engine 2 is configured that the power to be output is controlled on the basis of an output operation, such as an operation of an accelerator pedal by a driver.

A torque converter 6 that includes a lock-up clutch 6e is coupled to a crankshaft 2a of the engine 2. The torque converter 6 has a well-known configuration as a fluid transmission device, amplifies the torque by transmitting the torque via a fluid, and can transmit the torque in a directly-connected state by engaging the lock-up clutch 6e. A front cover 6a is coupled to the crankshaft 2a so as to rotate integrally, and a turbine liner 6c is arranged to face a pump impeller 6b that is integrated with the front cover 6a. A stator 6d that is held via an unillustrated one-way clutch is arranged between the pump impeller 6b and the turbine liner 6c. That is, the front cover 6a and the pump impeller 6b integrally rotate with the crankshaft 2a. In addition, the turbine liner 6c is coupled to integrally rotate with an input shaft 7 that constitutes a rotational shaft on an input side in a transmission. Furthermore, the lock-up clutch 6e that rotates with the turbine liner 6c in an integrated manner is arranged to face an inner surface of the front cover 6a. It should be noted that the one-way clutch is provided between the stator 6d and a fixed section such as a casing.

In addition, in the first specified example, a forward/reverse travel switching mechanism 8 is arranged on the input shaft 7. The forward/reverse travel switching mechanism 8 is a mechanism for switching between a forward travel state in which the torque transmitted from the input shaft 7 is transmitted in a manner that a rotational direction of the torque is not changed and a reverse travel state in which the torque is transmitted in a manner that the rotational direction of the torque is reversed. The forward/reverse travel switching mechanism 8 is constructed of a so-called differential mechanism in which plural rotation elements exhibit a differential action with each other. That is, various types of such differential mechanism have conventionally been known, and any of the differential mechanisms can be adopted as the forward/reverse travel switching mechanism in the invention. The forward/reverse travel switching mechanism 8 that is shown in FIG. 2 is constructed of a planetary gear unit of a double pinion type. That is, the forward/reverse travel switching mechanism 8 has plural rotation elements, and each of the rotation elements can constitute any one of an input element, an output element, and a reaction element.

As shown in FIG. 2, the forward/reverse travel switching mechanism 8 includes: a sun gear 8s as an outer gear; a ring gear 8r as an inner gear that is coaxially arranged with the sun gear 8s; a first pinion gear $8P_1$ that meshes with the sun gear 8s; a second pinion gear $8P_2$ that meshes with the first pinion gear $8P_1$ and the ring gear 8r; a carrier 8c that retains those pinion gears $8P_1$, $8P_2$ to allow rotation and revolution thereof.

In the first specified example, the sun gear 8s constitutes the input element and is configured to integrally rotate with the input shaft 7. The carrier 8c constitutes the output element and is configured to integrally rotate with a drive gear 41 that is included in the transmission mechanism 40 capable of setting the fixed transmission gear ratio, which will be described below. A first clutch mechanism $C_1$ for selectively coupling the carrier 8c and the sun gear 8s is provided between the carrier 8c as the output element and the sun gear 8s as the input element. The first clutch mechanism $C_1$ is arranged on the input shaft 7 and is configured to selectively transmit or block the torque between the input shaft 7 and the transmission mechanism 40, which will be described below. Furthermore, the first clutch mechanism $C_1$ of the first specified example is constructed of a friction-type clutch mechanism. Moreover, the first clutch mechanism $C_1$ is used to set a starting state in a forward travel direction and is a mechanism referred to as a start clutch and the like.

In addition, the first clutch mechanism $C_1$ is configured to directly transmit the torque of the input shaft 7 to the carrier 8c as the output element when being engaged. That is, the first clutch mechanism $C_1$ only needs to be configured to couple at least two rotation elements of the three rotation elements in the planetary gear unit, which constitutes the forward/reverse travel switching mechanism 8, so as to cause integral rotation of the entire planetary gear unit.

For example, in the case where the first clutch mechanism $C_1$ is engaged, the carrier 8c as the output element and the sun gear 8s as the input element are coupled, and the entire forward/reverse travel switching mechanism 8 rotates integrally. That is, when the first clutch mechanism $C_1$ is engaged, a rotational direction and a rotational speed of each of the rotation elements in the planetary gear unit become the same rotational speed in a positive rotational direction. It should be noted that the positive rotational direction refers to the same rotational direction as a rotational direction of the input shaft 7 and a negative rotational direction refers to an opposite direction of the rotational direction of the input shaft 7.

Furthermore, a brake mechanism $B_1$ that selectively stops rotation of the ring gear 8r in the forward/reverse travel switching mechanism 8 is provided on the input shaft 7, on which the forward/reverse travel switching mechanism 8 is provided. The brake mechanism $B_1$ is provided between the ring gear 8r and the fixed section such as the casing, and is constructed of a friction-type brake such as a multiplate brake or a meshing-type brake. That is, the ring gear 8r constitutes the reaction element. For example, in the case where the brake mechanism $B_1$ is engaged to stop the rotation of the ring gear 8r in a state where the input shaft 7 rotates, in regard to the rotational direction of each of the rotation elements, the sun gear 8s as the input element rotates in the positive rotational direction, the ring gear 8r as the reaction element is fixed, and the carrier 8c as the output element rotates in the negative rotational direction.

The continuously variable transmission (hereinafter described as the "CVT") 10, to which the torque of the input shaft 7 is input, has a structure of a belt-type continuously variable transmission that has conventionally been known. The CVT 10 includes: a primary shaft 9 and a secondary shaft 11 provided in parallel; a primary pulley 20 that integrally rotates with the primary shaft 9; a secondary pulley 30 that integrally rotates with the secondary shaft 11; and a belt 10a that is wound around these pulleys 20, 30. Each of the pulleys 20, 30 is configured to change a winding radius of the belt 10a to be increased or decreased by changing a width of a groove, on which the belt 10a is wound, to be widened or narrowed. That is, the CVT 10 is configured to change a transmission gear ratio $\gamma_{cvt}$ by the CVT 10 in continuous and stepless manners by changing the width of the groove, on which the belt 10a is wound.

In the first specified example, the primary shaft 9 is arranged on the same axis as the input shaft 7 and integrally rotates with the input shaft 7. That is, the primary shaft 9 is coupled to integrally rotate with the sun gear 8s of the forward/reverse travel switching mechanism 8. In addition, the primary pulley 20 is arranged on an opposite side of the engine 2 with the forward/reverse travel switching mechanism 8 being interposed therebetween in an axial direction. The primary pulley 20 includes: a fixed sheave 21 that is integrated with the primary shaft 9; and a movable sheave 22 that is fitted to the primary shaft 9 in a manner capable of reciprocating in the axial direction. Furthermore, a thrust application mechanism 23 that applies thrust to the movable sheave 22 so as to cause movement thereof to the fixed sheave 21 side is provided. The thrust application mechanism 23 is configured to generate the thrust that is applied to the movable sheave 22. Accordingly, the thrust application mechanism 23 is arranged on a back surface side of the movable sheave 22, that is, on an opposite side of the fixed sheave 21 with the movable sheave 22 being interposed therebetween in the axial direction. It should be noted that, in the first specified example, the primary shaft 9 may be described and explained as the input shaft 7 because the primary shaft 9 integrally rotates with the input shaft 7.

Meanwhile, the secondary pulley 30 includes: a fixed sheave 31 that is integrated with the secondary shaft 11; and a movable sheave 32 that is fitted to the secondary shaft 11 in a manner capable of reciprocating in the axial direction. In addition, a thrust application mechanism 33 that applies the thrust to the movable sheave 32 so as to cause movement thereof to the fixed sheave 31 side is provided. The thrust application mechanism 33 is configured to generate the axial thrust that is applied to the movable sheave 32. Accordingly, the thrust application mechanism 33 is arranged on a back surface side of the movable sheave 32 in the axial direction, that is, on an opposite side of the fixed sheave 31 with the movable sheave 32 being interposed therebetween. With the thrust applied from the thrust application mechanism 33, the movable sheave 32 generates a force for holding the belt 10a between the movable sheave 32 and the fixed sheave 31. It is configured to increase a friction force between the secondary pulley 30 and the belt 10a by increasing the holding force. Due to the friction force, the torque of the primary pulley 20 is transmitted to the secondary pulley 30 via the belt 10a, and the torque is further transmitted to the secondary shaft 11 that integrally rotates with the secondary pulley 30.

In the first specified example, a second clutch mechanism $C_2$ that selectively couples the secondary shaft 11 and an output shaft 12 is provided between the secondary pulley 30 and the output shaft 12. As shown in FIG. 2, the second clutch mechanism $C_2$ is arranged on the same axis as the output shaft 12 and is configured to selectively transmit or block the torque between the CVT 10 and the output shaft 12. Furthermore, the second clutch mechanism $C_2$ of the first specified example is constructed of a friction-type clutch mechanism. Moreover, the second clutch mechanism $C_2$ is used to set a forward travel state and includes a mechanism referred to as a forward clutch and the like. It is configured to transmit the torque from the input shaft 7 to the output shaft 12 via the CVT 10 by engaging the second clutch mechanism $C_2$ and connecting between the CVT 10 and the output shaft 12 in a manner capable of transmitting the torque.

In addition, it is configured to output the torque from the output shaft 12 to a front differential 16 as a final speed reducer via a speed reduction gear mechanism 14. As shown in FIG. 2, an output gear 13 is attached to the output shaft 12, and a large diameter gear 14a that meshes with this output gear 13 is attached to a speed reduction gear shaft 14b. A small diameter gear 14c is attached to this speed reduction gear shaft 14b, and this small diameter gear 14c meshes with a ring gear 15 of the front differential 16. Then, the front differential 16 is configured to transmit the torque, which is transmitted via the ring gear 15, from the right and left drive shafts 4 to the drive wheels 5.

It should be noted that each of the above-described first clutch mechanism $C_1$ and second clutch mechanism $C_2$ only needs to be a clutch that can selectively transmit the torque or block the torque and thus may be either a friction clutch or a meshing-type clutch; however, it is preferred to be constructed of a wet-type or dry-type friction clutch, with which transmission torque capacity is gradually increased or decreased in accordance with an engagement force.

Next, a description will be made on the torque transmission path that stretches from the engine 2 to the drive wheels 5 via the transmission mechanism 40, that is, the second transmission path. The transmission mechanism 40 is provided between the input shaft 7 and the output shaft 12 and is configured to be able to set one or plural fixed transmission gear ratios. The transmission mechanism 40 is constructed of a speed reduction mechanism, and a transmission gear ratio $\gamma_{gear}$ by the transmission mechanism 40 is set to a fixed transmission gear ratio that is higher than a maximum transmission gear ratio $\gamma_{cvtmax}$ that can be set by the CVT 10. That is, the transmission mechanism 40 is configured to be able to set the fixed transmission gear ratio (speed reduction gear ratio) $\gamma_{gear}$ as the transmission gear ratio that cannot be set by the CVT 10.

In the first specified example, as described above, the input shaft 7 and the transmission mechanism 40 are connected in a manner capable of transmitting the torque therebetween by engaging the first clutch mechanism $C_1$. As shown in FIG. 2, the transmission mechanism 40 is the speed reduction mechanism that includes a gear train provided between the input shaft 7 and the output shaft 12, and includes: the drive gear 41 on an input side; a driven gear 45 on an output side; and a counter shaft 43 that is arranged in parallel with the input shaft 7 and the output shaft 12 and sets a rotational direction of the drive gear 41 and a rotational direction of the driven gear 45 to be the same. That is, the transmission mechanism 40 is configured to include the plural gear pairs.

The drive gear 41 in the first specified example is fitted to an outer circumferential side of the input shaft 7 in a manner capable of relatively rotating with the input shaft 7 and is configured to integrally rotate with the carrier 8c as the output element of the forward/reverse travel switching mechanism 8. The drive gear 41 always meshes with a counter driven gear 42 that is provided on the counter shaft 43 and is formed to have a smaller diameter than the counter driven gear 42. That is, the number of tooth of the counter driven gear 42 is larger than the number of tooth of the drive gear 41. In other words, in the case where the torque is transmitted from the input shaft 7 toward the output shaft 12 via the transmission mechanism 40, a speed reducing action is generated by a first gear pair that includes the drive gear 41 and the counter driven gear 42.

In addition, the counter shaft 43 includes a counter drive gear 44 that is formed to have a smaller diameter than the counter driven gear 42. The counter drive gear 44 always meshes with the driven gear 45 and is formed to have a smaller diameter than the driven gear 45. That is, the number of tooth of the driven gear 45 is larger than the number of tooth of the counter drive gear 44. In other words, in the case where the torque is transmitted from the input shaft 7 toward the output shaft 12 via the transmission mechanism 40, the speed reducing action is generated by a second gear pair that includes the counter drive gear 44 and the driven gear 45. Accordingly, the transmission gear ratio (the speed reduction gear ratio) $\gamma_{gear}$ by the transmission mechanism 40 has a value that is obtained by multiplying a speed reduction gear ratio (a gear ratio) between the drive gear 41 and the counter driven gear 42 by a speed reduction gear ratio (a gear ratio) between the counter drive gear 44 and the driven gear 45.

In addition, the driven gear 45 in the first specified example is formed to be hollow and is fitted to an outer circumferential side of the output shaft 12 in a manner capable of relatively rotating with the output shaft 12. Furthermore, the driven gear 45 is formed to integrally rotate with a clutch gear 53 that is provided with a spline on an outer circumferential surface. The clutch gear 53 is formed to have a smaller diameter than the driven gear 45. In the first specified example, a meshing-type clutch mechanism $D_1$ that selectively couples the driven gear 45 and the output shaft 12 is provided between the driven gear 45 and the output shaft 12.

The meshing-type clutch mechanism $D_1$ of the first specified example is a mechanism that is arranged on the output shaft 12 so as to selectively transmit or block the torque between the transmission mechanism 40 and the output shaft 12. In this specified example, the first clutch mechanism $C_1$ can be the friction clutch. Accordingly, the meshing-type clutch mechanism $D_1$ may have a configuration for switching between two states of an engaged state and a disengaged state, and the transmission torque capacity thereof does not have to have a value between 0% and 100%. Thus, the meshing-type clutch mechanism $D_1$ can be constructed of a dog clutch, a synchromesh mechanism, or the like. FIG. 2 shows an example in which the meshing-type clutch mechanism $D_1$ is constructed of the synchromesh mechanism that couples the driven gear 45 to the output shaft 12 by fitting a spline formed on an inner circumferential surface of a sleeve 52 that can move in the axial direction of the output shaft 12 to both of a spline formed on an outer circumferential surface of the clutch gear 53 and a spline formed on an outer circumferential surface of a hub 51 that is configured to integrally rotate with the output shaft 12. Furthermore, an unillustrated appropriate actuator for moving the sleeve 52 in the axial direction is provided, and it is configured to electrically control actuation of the actuator by the ECU 1. It should be noted that the actuator may be a hydraulic actuator that is operated by hydraulic pressure. Accordingly, the meshing-type clutch mechanism $D_1$ is a rotation synchronizing device and is configured to set rotational speeds of the output shaft 12 as a synchronizing-side member and the driven gear 45 as a synchronized-side member to be equal by the friction force. In addition, in the following description, the meshing-type clutch mechanism $D_1$ is described and explained as the dog clutch $D_1$.

Thus, the first clutch mechanism $C_1$ and the dog clutch $D_1$ are mechanisms for selectively connecting the second transmission path in the manner capable of transmitting the torque. In addition, the first clutch mechanism $C_1$ and the dog clutch $D_1$ are arranged in series in the second transmission path. In the first specified example, the dog clutch $D_1$ is arranged on a downstream side (the drive wheels 5 side) of the first clutch mechanism $C_1$ in the second transmission path in a torque transmission direction from the engine 2 side toward the drive wheels 5 side. Accordingly, the torque can be transmitted from the engine 2 to the drive wheels 5 via the transmission mechanism 40 by engaging both of the first clutch mechanism $C_1$ and the dog clutch $D_1$. In other words, the transmission of the torque via the second transmission path is blocked between the input shaft 7 and the output shaft 12 by disengaging at least either one of the first clutch mechanism $C_1$ and the dog clutch $D_1$. Briefly, the first clutch mechanism $C_1$ and the dog clutch $D_1$ function as a disengaging mechanism for blocking the transmission of the torque that stretches from the engine 2 to the drive wheels 5 in the second transmission path, that is, the path switching mechanism A for switching between the first transmission path and the second transmission path.

In addition, as shown in FIG. 1, as the signals input to the ECU 1 for controlling the actuation of the path switching mechanism A, detection signals, such as the engine speed Ne, a vehicle speed V that is detected by a vehicle speed sensor, a rotational speed of the drive shaft 4, an accelerator operation amount Acc that is based on an operation of an accelerator pedal, and a brake pedal operation, are included. For example, the ECU 1 is configured to compute a requested drive amount, a target transmission gear ratio, target engine torque, and the like on the basis of the accelerator operation amount Acc and the vehicle speed V and be able to control the engine 2 to be driven at an operation point with excellent fuel economy on the basis of computed values.

In the vehicle Ve that is configured as described above, it is configured that the torque is transmitted from the input shaft 7 to the output shaft 12 via the transmission mechanism 40 in the case where the vehicle Ve starts running in the forward travel direction and in the case of a reverse travel, and it is configured that the torque is transmitted from the input shaft 7 to the output shaft 12 via the CVT 10 in the case of the forward travel at the vehicle speed V that is increased to a certain degree. That is, the ECU 1 is configured to control the actuation of the path switching mechanism A in accordance with the operation state of the vehicle Ve, so as to either block the transmission of the torque in the first transmission path between the engine 2 and the drive wheels 5 and connect the second transmission path in the manner capable of transmitting the torque or connect the first transmission path in the manner capable of transmitting the torque and block the transmission of the torque in the second transmission path.

In FIG. 3, the engaged states and the disengaged states of each of the clutch mechanisms $C_1$, $C_2$, $D_1$ and the brake mechanism $B_1$ are collectively shown in a table. In addition, "ON" described in FIG. 3 indicates being engaged, and "OFF" indicates being disengaged. Furthermore, "ON" in a parenthesis indicates being transiently brought into the engaged state, and "OFF" in a parenthesis indicates the mechanism may be in either the engaged state or the disengaged state. That is, any of various states can be set by combining the engaged state and the disengaged state of each of the clutch mechanisms $C_1$, $C_2$, $D_1$ and the brake mechanism $B_1$ in accordance with the operation state of the vehicle Ve. For example, it is configured that the actuation of the path switching mechanism A is controlled by the ECU 1 when a drive position (a drive range) or a reverse position (a reverse range) is selected by an unillustrated shift device or shift lever.

When the vehicle starts in the forward travel direction, each of the clutch mechanisms $C_1$, $C_2$, $D_1$ and the brake mechanism $B_1$ are set as in the starting state shown in FIG. 3. In this way, the state capable of transmitting the torque from the input shaft 7 to the output shaft 12 via the transmission mechanism 40, that is, a gear travel mode is set. More specifically, since the first clutch mechanism $C_1$ is engaged on the input shaft 7 side, the input shaft 7 and the transmission mechanism 40 are connected in the manner capable of transmitting the torque therebetween, and the torque output by the engine 2 is transmitted to the transmission mechanism 40 via the input shaft 7 and the forward/reverse travel switching mechanism 8. Since the two rotation elements of the forward/reverse travel switching mechanism 8 are coupled by the first clutch mechanism $C_1$, the entire forward/reverse travel switching mechanism 8 rotates integrally. Accordingly, the forward/reverse travel switching mechanism 8 does not generate a speed increasing action or the speed reducing action but transmits the torque input from the input shaft 7 to the drive gear 41 of the transmission mechanism 40. Meanwhile, since the dog clutch $D_1$ is engaged on the output shaft 12 side, the transmission mechanism 40 and the output shaft 12 are connected in the manner capable of transmitting the torque therebetween, and the torque of the input shaft 7 is transmitted to the output shaft 12 via the transmission mechanism 40. Furthermore, since the second clutch mechanism $C_2$ is disengaged, the disengagement prevents the transmission of the torque between the secondary pulley 30 and the output shaft 12.

Then, in the case where the vehicle speed V is increased to a predetermined specified vehicle speed after the vehicle starts in the forward travel direction, each of the clutch mechanisms $C_1$, $C_2$, $D_1$ and the brake mechanism $B_1$ are set as in the forward travel state shown in FIG. 3. In this way, the state capable of transmitting the torque from the input shaft 7 to the output shaft 12 via the CVT 10, that is, a CVT travel mode is set. In other words, it is configured to switch from the gear travel mode to the CVT travel mode when the vehicle speed V is increased to a certain degree. More specifically, the engaged first clutch mechanism $C_1$ is disengaged and the disengaged second clutch mechanism $C_2$ is engaged in a state where the transmission gear ratio $\gamma_{cvt}$ by the CVT 10 is set to the maximum transmission gear ratio $\gamma_{cvtmax}$ or a transmission gear ratio near the maximum transmission gear ratio $\gamma_{cvtmax}$. In this way, since the first clutch mechanism $C_1$ is further disengaged in a state where the brake mechanism $B_1$ is disengaged, the forward/reverse travel switching mechanism 8 is brought into a state where each of the rotation elements rotates freely. As a result, in the first specified example, the input shaft 7 and the transmission mechanism 40 are decoupled. On the contrary, since the second clutch mechanism $C_2$ is engaged, the secondary pulley 30 is coupled to the output shaft 12. Accordingly, the torque of the input shaft 7 is transmitted to the output shaft 12 via the CVT 10. In this CVT travel mode, the engine speed Ne can be set to a speed with the excellent fuel economy by gradually decreasing the transmission gear ratio $\gamma_{cvt}$ by the CVT 10 or changing the transmission gear ratio $\gamma_{cvt}$ in accordance with the vehicle speed V and the accelerator operation amount Acc.

In addition, since the transmission gear ratio $\gamma_{gear}$ by the transmission mechanism 40 is higher than the maximum transmission gear ratio $\gamma_{cvtmax}$ by the CVT 10, the transmission gear ratio or drive power is changed upon switching from the gear travel mode to the CVT travel mode. Thus, in the first specified example, the first and second clutch mechanisms $C_1$, $C_2$ are each constructed of the friction-type clutch mechanism, and it is configured that those clutch mechanisms $C_1$, $C_2$ are transiently subjected to slip control in the case where the engaged first clutch mechanism $C_1$ is disengaged and the disengaged second clutch mechanism $C_2$ is engaged. The slip control is control that has conventionally been known as clutch-to-clutch control. More specifically, engagement pressure of the second clutch mechanism $C_2$ is gradually increased so as to gradually increase the transmission torque capacity of the second clutch mechanism $C_2$, and in conjunction with this, engagement pressure of the first clutch mechanism $C_1$ is gradually decreased so as to gradually reduce the transmission torque capacity of the first clutch mechanism $C_1$. Due to the configuration just as described, the torque is smoothly changed upon switching from the gear travel mode to the CVT travel mode. Thus, generation of a gear shift shock can be avoided or suppressed.

Then, it is configured that the dog clutch $D_1$ is disengaged and the transmission mechanism 40 is decoupled from the first transmission path after the gear travel mode is switched to the CVT travel mode, the first clutch mechanism $C_1$ is disengaged, the second clutch mechanism $C_2$ is completely engaged, and it is in a state where the torque can stably be transmitted through the CVT 10, that is, in the case where a specified travel condition is satisfied. That is, in the first specified example, the dog clutch $D_1$, which is engaged during the gear travel mode, keeps being engaged immediately after engagement shifting operations are performed on the first clutch mechanism $C_1$ and the second clutch mechanism $C_2$ and the gear travel mode is switched to the CVT travel mode. Accordingly, the transmission mechanism 40 acts as a rotational inertia body on the output shaft 12 during the CVT travel mode. It should be noted that, since the first clutch mechanism $C_1$ has already been disengaged and the torque of the input shaft 7 is not applied to the transmission mechanism 40 in the CVT travel mode, the dog clutch $D_1$ can be disengaged. In other words, the dog clutch $D_1$ can be engaged or disengaged in the CVT travel mode.

Meanwhile, when the vehicle Ve makes a reverse travel, each of the clutch mechanisms $C_1$, $C_2$, $D_1$ and the brake mechanism $B_1$ are set as in a reverse travel state shown in FIG. 3. In this way, the gear travel mode is set. More specifically, the first clutch mechanism $C_1$ and the second clutch mechanism $C_2$ are disengaged, and the dog clutch $D_1$ and the brake mechanism $B_1$ are engaged. In this case, since the torque of the engine 2 is input to the sun gear 8s as the input element in a state where the ring gear 8r as the reaction element is fixed by the brake mechanism $B_1$ in the forward/reverse travel switching mechanism 8, the carrier 8c as the output element rotates in the opposite direction with respect to the sun gear 8s as the input element. Accordingly, the torque is transmitted from the input shaft 7 to the output shaft 12 via the transmission mechanism 40, and the rotational direction of the torque becomes an opposite direction of the rotational direction of the torque of the input shaft 7.

In addition, in the vehicle Ve as the target of the invention, since the CVT 10 and the transmission mechanism 40 are provided in parallel between the input shaft 7 and the output shaft 12, a neutral state includes states where the transmission of the torque between either one of the input shaft 7 and the output shaft 12 and the CVT 10 is blocked and where the transmission of the torque between either one of the input shaft 7 and the output shaft 12 and the transmission mechanism 40 is blocked. In other words, it is configured to travel while either one of the first transmission path and the second transmission path is connected in the manner capable of transmitting the torque between the input shaft 7 and the output shaft 12. Accordingly, as shown in FIG. 3, a "first disengaged state" that is a state where the first clutch mechanism $C_1$ is disengaged and the dog clutch $D_1$ is engaged, a "second disengaged state" that is a state where the first clutch mechanism $C_1$ is engaged and the dog clutch $D_1$ is disengaged, or a "third disengaged state" that is a state where the first clutch mechanism $C_1$ and the dog clutch $D_1$ are disengaged can be set. In addition, in each of the disengaged states, it is brought into a state where the transmission mechanism 40 can rotate freely, and the second clutch mechanism $C_2$ may be in either state of the engaged state or the disengaged state. Furthermore, as shown in FIG. 3, the brake mechanism $B_1$ is disengaged in each of the disengaged states described herein.

In the case where the first disengaged state is set, the transmission mechanism 40 is decoupled from the input shaft 7 and is coupled to the output shaft 12 in the powertrain shown in FIG. 2. That is, in the first disengaged state of the first specified example, the transmission of the torque between the input shaft 7 and the transmission mechanism 40 is blocked, and the transmission mechanism 40 and the output shaft 12 are connected in the manner capable of transmitting the torque therebetween.

For example, in the case where the second clutch mechanism $C_2$ is disengaged in the first disengaged state, the vehicle Ve is brought into the neutral state. On the other hand, in the case where the second clutch mechanism $C_2$ is engaged in the first disengaged state, the vehicle Ve is set in the CVT travel mode, and the output shaft 12 causes rotation of the transmission mechanism 40 therewith. That is, the transmission mechanism 40 is in a state capable of rotating idle by the torque of the output shaft 12 and functions as the rotational inertia body on the output shaft 12. That is, it is configured that a rotational member, to which the torque of the output shaft 12 is transmitted, of the gear train for constituting the transmission mechanism 40 functions as the rotational inertia body that acts on the output shaft 12. Accordingly, equivalent inertial moment $I_{gear}$ related to the transmission mechanism 40 acts on the output shaft 12, and a value of the moment is determined on the basis of a magnitude of the transmission gear ratio (the speed reduction gear ratio) $\gamma_{gear}$ by the transmission mechanism 40.

More specifically, the transmission mechanism 40 that runs idle in the first disengaged state includes: the first gear pair that includes the drive gear 41 and the counter driven gear 42; and the second gear pair that includes the counter drive gear 44 and the driven gear 45. Accordingly, output shaft equivalent inertial moment $I_{out}$ includes a value obtained by adding a value obtained by dividing a second power of a value (a first speed increase ratio), which is obtained by dividing the number of tooth of the counter drive gear 44 by the number of tooth of the driven gear 45, by a value of inertial moment related to the counter shaft 43 to a value obtained by dividing a second power of a value, which is obtained by multiplying a value (a second speed increase ratio) obtained by dividing the number of tooth of the counter drive gear 41 by the number of tooth of the counter driven gear 42 by the first speed increase ratio, by a value of the inertial moment related to the drive gear 41. That is, the output shaft equivalent inertial moment $I_{out}$ is decreased as an inverse number of the transmission gear ratio (the speed reduction gear ratio) $\gamma_{gear}$ by the transmission mechanism 40 becomes a higher value. In addition, the output shaft equivalent inertial moment $I_{out}$ is increased as the inverse number becomes a smaller number. In other words, the output shaft equivalent inertial moment $I_{out}$ is increased as the transmission gear ratio (the speed reduction gear ratio) $\gamma_{gear}$ by the transmission mechanism 40 becomes a higher value, and the output shaft equivalent inertial moment $I_{out}$ is decreased as the transmission gear ratio (the speed reduction gear ratio) $\gamma_{gear}$ thereby becomes a lower value.

In the case where the second disengaged state is set, the transmission mechanism 40 is coupled to the input shaft 7 and is decoupled from the output shaft 12 in the powertrain shown in FIG. 2. That is, in the second disengaged state of this specified example, the input shaft 7 and the transmission mechanism 40 are connected in the manner capable of transmitting the torque therebetween, and the transmission of the torque between the transmission mechanism 40 and the output shaft 12 is blocked.

For example, in the case where the second clutch mechanism $C_2$ is engaged in the second disengaged state, the vehicle Ve is set in the CVT travel mode, and the input shaft 7 causes rotation of the transmission mechanism 40 therewith. Accordingly, a rotational member, to which the torque of the input shaft 7 is transmitted, of the gear train for constituting the transmission mechanism 40 functions as a rotational inertia body that acts on the input shaft 7. On the other hand, in the case where the second clutch mechanism $C_2$ is disengaged in the second disengaged state, the vehicle Ve is brought into the neutral state.

More specifically, during the CVT travel mode in the second disengaged state, the transmission mechanism 40 rotates idle by the torque of the input shaft 7, and the equivalent inertial moment $I_{gear}$ related to the transmission mechanism 40 acts as a load on the input shaft 7. The transmission mechanism 40 that runs idle in the second disengaged state includes: the first gear pair that includes the drive gear 41 and the counter driven gear 42; and the second gear pair that includes the counter drive gear 44 and the driven gear 45. Input shaft equivalent inertial moment $I_{in}$ includes a value obtained by adding a value, which is obtained by dividing a value of a second power of a gear ratio by the first gear pair (a first speed reduction gear ratio) by the inertial moment related to the counter shaft 43, to a value obtained by dividing a value of a second power of a value, which is obtained by multiplying a gear ratio by the second gear pair (a second speed reduction gear ratio) by the first speed reduction gear ratio, by the inertial moment related to the driven gear 45. Accordingly, the equivalent inertial moment $I_{in}$ related to the input shaft 7 is increased as the transmission gear ratio (the speed reduction gear ratio) $\gamma_{gear}$ is decreased, and, on the contrary, is decreased as the transmission gear ratio (the speed reduction gear ratio) $\gamma_{gear}$ is increased.

As described above, in the powertrain shown in FIG. 2, as a state where the transmission mechanism 40 is joined as the rotational inertia body that cannot transmit the torque to the first transmission path, a case where the transmission mechanism 40 is coupled to the input shaft 7 or a case where the transmission mechanism 40 is coupled to the output shaft 12 can be made. Meanwhile, the transmission gear ratio $\gamma_{gear}$ by the transmission mechanism 40 is constant, and the transmission mechanism 40 is configured as the speed reduction mechanism. Accordingly, in the case where the transmission mechanism 40 that can rotate freely is joined to the first transmission path, a larger inertial force can act on the first transmission path when the transmission mechanism 40 is coupled to the output shaft 12 than when the transmission mechanism 40 is coupled to the input shaft 7. That is, the equivalent inertial moment $I_{gear}$ related to the transmission mechanism 40 can effectively be used by the gear ratio without increasing the weight of the powertrain.

In the case where the third disengaged state is set, the transmission mechanism 40 is decoupled from the input shaft 7 and the output shaft 12 in the powertrain shown in FIG. 2. That is, in the third disengaged state of the first specified example, the transmission of the torque between the input shaft 7 and the transmission mechanism 40 and between the transmission mechanism 40 and the output shaft 12 is blocked. That is, in the third disengaged state, the rotational member that constitutes the transmission mechanism 40 does not function as the rotational inertia body that acts on the input shaft 7 or the output shaft 12. In other words, in the case where the second clutch mechanism $C_2$ is engaged in the third disengaged state, the vehicle Ve is set in the CVT travel mode, and the input shaft 7 and the output shaft 12 do not cause the rotation of the transmission mechanism 40 therewith. It should be noted that, in the case where the second clutch mechanism $C_2$ is disengaged in the third disengaged state, the vehicle Ve is brought into the neutral state.

Figure 4:
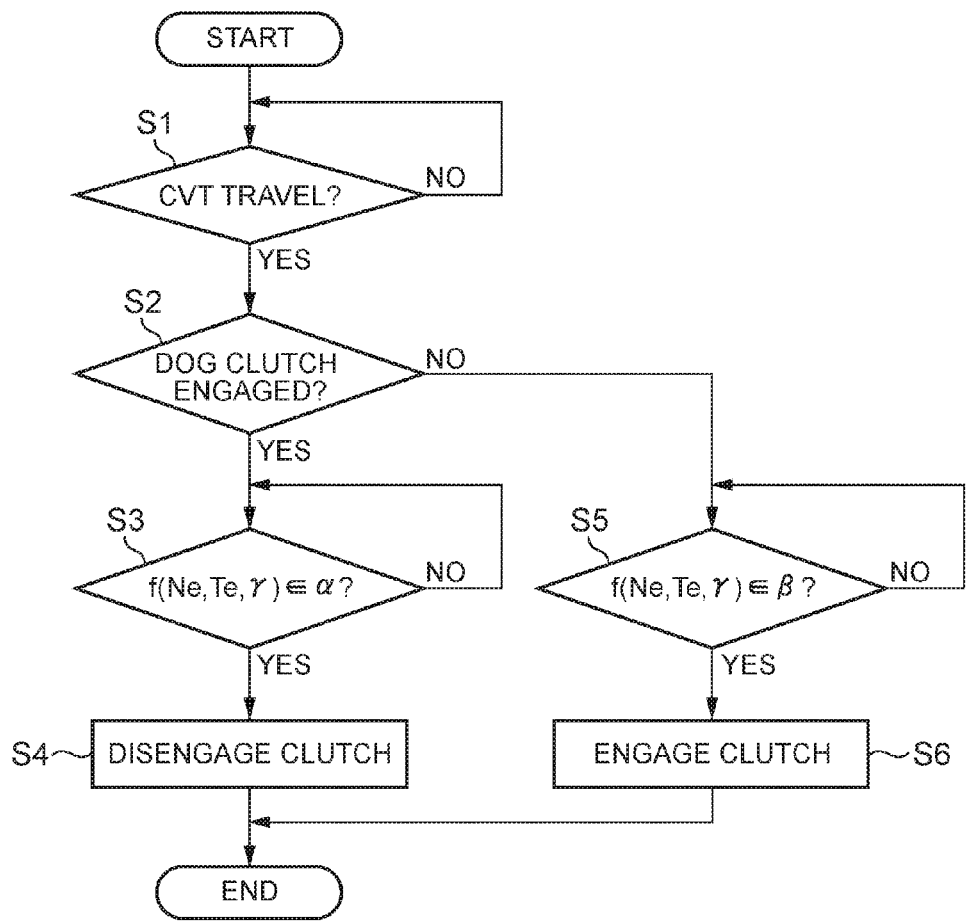
FIG. 4 is a flowchart that is executed when actuation of a path switching mechanism is controlled in accordance with the operation state of the vehicle.

Next, with reference to FIG. 4, a description will be made on a control flow for controlling actuation of the dog clutch $D_1$, which is arranged on the relatively downstream side, among the first clutch mechanism $C_1$ and the dog clutch $D_1$ arranged in series in the second transmission path, in accordance with the operation state of the vehicle Ve during the CVT travel mode. As shown in FIG. 4, the ECU 1 determines whether it is in the operation state where the output torque from the engine 2 is transmitted to the drive wheels 5 via the CVT 10, that is, during the CVT travel mode (step S1). For example, determination processing of this step S1 is configured to determine whether a signal, which indicates that determination means 101 included in the ECU 1 as shown in FIG. 1 is in the CVT travel mode, is input. In addition, the determination processing of this step S1 may be configured to determine that the determination means 101 is in the CVT travel mode in the case where the ECU 1 detects that the first clutch mechanism $C_1$ is disengaged and the second clutch mechanism $C_2$ is completely engaged on the basis of the detection signal input from the sensor S. Then, if the CVT travel mode is not set and thus it is determined negative in step S1, the ECU 1 returns the flow and repeats the determination processing of step S11.

If it is set in the CVT travel mode and thus it is determined positive in step S1, the ECU 1 determines whether the dog clutch $D_1$ is engaged (step S2). The determination processing of this step S2 is processing for determining whether the transmission mechanism 40 is rotated with the output shaft 12 during the CVT travel mode. For example, the ECU 1 is configured to execute the determination processing of step S2 on the basis of an input signal, such as a detection signal from a stroke sensor for detecting a stroke amount of the actuator that actuates the dog clutch $D_1$ or a detection signal from a sensor that detects a position of the above-described sleeve.

If the dog clutch $D_1$ is engaged during the CVT travel mode and thus it is determined positive in step S2, the determination means 101 of the ECU 1 determines whether to disengage the dog clutch $D_1$ on the basis of the engine speed Ne, the engine torque Te, and the transmission gear ratio $\gamma_{cvt}$ (step S3). For example, determination processing in this step S3 is configured to determine whether to disengage the dog clutch $D_1$ by using a determination map that is stored in storage means of the ECU 1. The determination map is a determination map that is used to determine whether a CVT travel is made by engaging the dog clutch $D_1$ or the CVT travel is made by disengaging the dog clutch $D_1$ on the basis of the engine speed Ne, the engine torque Te, and the transmission gear ratio $\gamma_{cvt}$. One example of the determination map is shown in FIG. 5.

Figure 5:
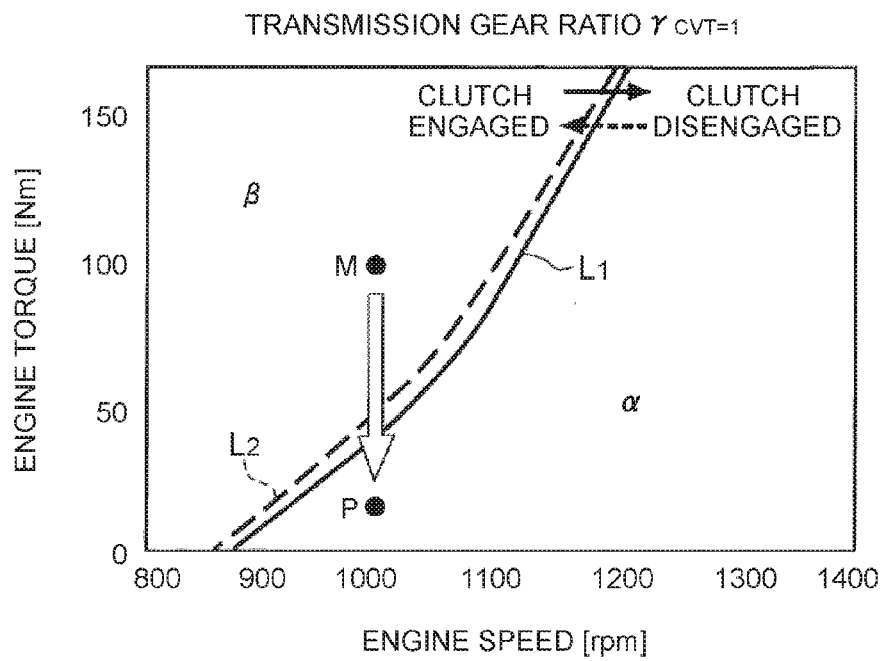
FIG. 5 is a map that shows one example of a determination map used for determination processing of whether to engage or disengage a clutch, which is arranged on a downstream side among plural clutches arranged in series in a torque transmission path including a transmission mechanism, during a CVT travel.

FIG. 5 shows one example of the determination map and shows the determination map in the case where "the transmission gear ratio $\gamma_{cvt}$=1". In addition, as shown in FIG. 5, a boundary line $L_1$ indicated by a solid line indicates a boundary for disengaging the engaged dog clutch $D_1$, and a boundary line $L_2$ indicated by a dotted line indicates a boundary for engaging the disengaged dog clutch $D_1$. Accordingly, a range $\alpha$ on a right side of the boundary line $L_1$, that is, a high-speed side indicates an operation range in which the dog clutch $D_1$ is disengaged during the CVT travel, and a range $\beta$ on a left side of the boundary line $L_2$, that is, a low-speed side indicates an operation range in which the dog clutch $D_1$ is engaged. Furthermore, a point M shown in FIG. 5 indicates a first operation state where the transmission gear ratio $\gamma_{cvt}$ is 1.0, the engine speed Ne is 1000 rpm, and the engine torque Te is 100 Nm. A point P indicates a second operation state where the transmission gear ratio $\gamma_{cvt}$ is 1.0, the engine speed Ne is 1000 rpm, and the engine torque Te is 10 Nm.

For example, when a driver performs an operation of releasing the accelerator pedal, the engine torque Te is decreased, and the first operation state (the point M) is changed to the second operation state (the point P). At this time, since the operation point that is set by the engine torque Te and the engine speed Ne crosses the boundary line $L_1$ from the range $\beta$ toward the range $\alpha$, the determination means 101 determines to disengage the dog clutch $D_1$. Just as described, in the determination processing of step S3, it is configured to determine whether the engaged dog clutch $D_1$ is disengaged on the basis of the engine speed Ne, the engine torque Te, the transmission gear ratio $\gamma_{cvt}$, and the determination map. That is, the determination processing of step S3 may be configured to determine whether the operation state of the vehicle Ve is shifted from a state of belonging to the range $\beta$ to a state of belonging to the range $\alpha$ on the determination map as shown in FIG. 5. It should be noted that the boundary lines $L_1$, $L_2$ only need to indicate a boundary between a travel range in which a vibration and noise are likely to be generated in the torque transmission path, such as a low-rotation high-load range of the engine 2, and a travel range in which these vibration and noise are unlikely to be generated, such as a high-rotation low-load range of the engine 2.

In addition, the determination processing of step S3 may be configured to include first engagement determination means that determines whether the engine speed Ne is at most equal to a predetermined specified engine speed $Ne_1$. In the case of being configured just as described, it is configured to keep the engaged state of the dog clutch $D_1$ since it is determined that the engine speed Ne is at most equal to the specified engine speed $Ne_1$. In addition, it is configured to include second engagement determination means that determines whether the engine torque Te is at least equal to predetermined specified engine torque $Te_1$ since it is determined in the first engagement determination means that the engine speed Ne is higher than the specified engine speed $Ne_1$. It is configured to keep the engaged state of the dog clutch $D_1$ since it is determined that the engine torque Te is at least equal to the specified engine torque $Te_1$. Furthermore, it is configured to include third engagement determination means that determines whether the transmission gear ratio $\gamma_{cvt}$ by the CVT 10 is at most equal to a predetermined specified transmission gear ratio $\gamma_{cvt1}$ since it is determined in the second engagement determination means that the engine torque Te is lower than the specified engine torque $Te_1$. It is configured to keep the engaged state of the dog clutch $D_1$ since it is determined that the transmission gear ratio $\gamma_{cvt}$ is at most equal to the specified transmission gear ratio $\gamma_{cvt1}$. For example, as the specified engine speed $Ne_1$, an engine speed that is included in a travel range where a vibration that is originated from the engine 2 and is transmitted to the first transmission path is relatively increased, such as the low-rotation high-load range of the engine 2, is set. Furthermore, also regarding the specified engine torque $Te_1$ and the specified transmission gear ratio $\gamma_{cvt1}$, engine torque and a transmission gear ratio that are included in the travel range where the vibration that is originated from the engine 2 and is transmitted to the first transmission path is relatively increased are respectively set.

Alternatively, the determination processing in step S3 may be configured to determine the actuation of the dog clutch $D_1$ on the basis of the accelerator operation amount Acc instead of the engine torque Te in the case where it is configured to include the above-described first engagement determination means, second engagement determination means, and third engagement determination means. In this case, the above-described second engagement determination means is configured to determine whether the accelerator operation amount Acc is at least equal to a predetermined specified accelerator operation amount $Acc_1$. Then, the engaged state of the dog clutch $D_1$ is kept since the accelerator operation amount Acc is at least equal to the specified accelerator operation amount $Acc_1$. Similarly, it may be configured to determine the actuation of the dog clutch $D_1$ on the basis of the vehicle speed V instead of the transmission gear ratio $\gamma_{cvt}$, or it may be configured to determine whether the vehicle speed V is at most equal to a predetermined specified vehicle speed $V_1$ and keep the engaged state of the dog clutch $D_1$ since the vehicle speed V is at most equal to the specified vehicle speed $V_1$.

Then, in the case where it is determined negative in step S3 since the operation state, which is based on the engine speed Ne, the engine torque Te, and the transmission gear ratio $\gamma_{cvt}$, does not belong to the range $\alpha$ of the determination map, the ECU 1 keeps the engaged state of the dog clutch $D_1$ and returns the flow to step S3. It should be noted that, in the case where it is determined negative in step S3, the ECU 1 may be configured to output an instruction signal for keeping the engagement of the dog clutch $D_1$.

On the other hand, in the case where it is determined positive in step S3 since the operation state, which is based on the engine speed Ne, the engine torque Te, and the transmission gear ratio $\gamma_{cvt}$, belongs to the range $\alpha$, the ECU 1 outputs an instruction signal for disengaging the dog clutch $D_1$ (step S4). For example, control processing in this step S4 is configured that instruction means 102 outputs the instruction signal for disengaging the dog clutch $D_1$ to the appropriate actuator that actuates the dog clutch $D_1$ in the case where the determination means 101 determines the disengagement of the dog clutch $D_1$ during the CVT travel mode. That is, in the configuration that includes the above-described first, second, and third engagement determination means, it may be configured to output the instruction signal for disengaging the dog clutch $D_1$ in the case where it is determined in the third engagement determination means that the transmission gear ratio $\gamma_{cvt}$ is higher than the specified transmission gear ratio $\gamma_{cvt1}$ or in the case where it is determined that the vehicle speed V is higher than the specified vehicle speed $V_1$. Then, the ECU 1 is configured that the instruction means 102 outputs the instruction signal for disengaging the dog clutch $D_1$, so as to terminate this control processing. It should be noted that the ECU 1 may be configured to terminate this control processing in the case where a detection signal for detecting that the dog clutch $D_1$ has been disengaged by the control processing in step S4 is input by the specified sensor S, such as the above-described stroke sensor.

In addition, in the case where it is determined negative in step S2 since the dog clutch $D_1$ is disengaged during the CVT travel mode, the determination means 101 determines whether to engage the dog clutch $D_1$ on the basis of the engine speed Ne, the engine torque Te, and the transmission gear ratio $\gamma_{cvt}$ (step S5). For example, similar to the above-described determination processing in step S3, the determination processing of this step S5 is configured to determine whether to engage the dog clutch $D_1$ by referring to FIG. 5 and using the above-described determination map.

For example, as shown in FIG. 5, when the driver performs an operation to depress the accelerator pedal, the engine torque Te is increased, and the second operation state indicated at the point P is changed to the first operation state indicated at the point M. At this time, since the operation point crosses the boundary line $L_2$ from the range α toward the range β, the determination means 101 determines to engage the dog clutch $D_1$. Just as described, in the determination processing of step S5, it is configured to determine whether to engage the dog clutch $D_1$ in the disengaged state on the basis of the engine rotation speed Ne, the engine torque Te, the transmission gear ratio $\gamma_{cvt}$, and the determination map. That is, the determination processing of step S5 may be configured to determine whether the operation state of the vehicle Ve has been shifted from the state of belonging to the range α to the state of belonging to the range β on the determination map as shown in FIG. 5.

Accordingly, the determination processing in step S5 may be configured to include first determination means that determines whether the engine speed Ne is at least equal to a predetermined specified engine speed $Ne_2$. In the case of being configured just as described, it is configured to keep the disengaged state of the dog clutch $D_1$ since it is determined that the engine speed Ne is at least equal to the specified engine speed $Ne_2$. In addition, it is configured to include second determination means that determines whether the engine torque Te is at most equal to predetermined specified engine torque $Te_2$ since it is determined in the first determination means that the engine speed Ne is lower than the specified engine speed $Ne_2$. It is configured to keep the disengaged state of the dog clutch $D_1$ since it is determined that the engine torque Te is at most equal to the specified engine torque $Te_2$. Furthermore, it is configured to include third determination means that determines whether the transmission gear ratio $\gamma_{cvt}$ by the CVT 10 is at least equal to a predetermined specified transmission gear ratio $\gamma_{cvt2}$ since it is determined in the second determination means that the engine torque Te is higher than the specified engine torque $Te_2$. It is configured to keep the disengaged state of the dog clutch $D_1$ since it is determined that the transmission gear ratio $\gamma_{cvt}$ is at least equal to the specified transmission gear ratio $\gamma_{cvt2}$. For example, as the specified engine speed $Ne_e$, an engine speed that is included in the travel range where the vibration that is originated from the engine 2 and is transmitted to the first transmission path is relatively increased, such as the low-rotation high-load range of the engine 2, is set. Moreover, also regarding the specified engine torque $Te_2$ and the specified transmission gear ratio $\gamma_{cvt2}$, the engine torque and the transmission gear ratio that are included in the travel range where the vibration that is originated from the engine 2 and is transmitted to the first transmission path is relatively increased are respectively set.

Alternatively, the determination processing in step S5 may be configured to determine the actuation of the dog clutch $D_1$ on the basis of the accelerator operation amount Acc instead of the engine torque Te in the case where it is configured to include the above-described first determination means, second determination means, and third determination means. In this case, the above-described second determination means is configured to determine whether the accelerator operation amount Acc is at most equal to a predetermined specified accelerator operation amount $Acc_2$. Then, the engaged state of the dog clutch $D_1$ is kept since the accelerator operation amount Acc is at most equal to the specified accelerator operation amount $Acc_2$. Similarly, it may be configured to determine the actuation of the dog clutch $D_1$ on the basis of the vehicle speed V instead of the transmission gear ratio $\gamma_{cvt}$, or it may be configured to determine whether the vehicle speed V is at least equal to a predetermined specified vehicle speed $V_2$ and keep the engaged state of the dog clutch $D_1$ since the vehicle speed V is at least equal to the specified vehicle speed $V_2$.

Then, in the case where it is determined negative in step S5 since the operation state, which is based on the engine speed Ne, the engine torque Te, and the transmission gear ratio $\gamma_{cvt}$, does not belong to the range β of the determination map, the ECU 1 keeps the disengaged state of the dog clutch $D_1$ and returns the flow to step S5. It should be noted that, in the case where it is determined negative in step S5, the ECU 1 may be configured to output the instruction signal for keeping the disengagement of the dog clutch $D_1$.

On the other hand, in the case where it is determined positive in step S5 since the operation state, which is based on the engine speed Ne, the engine torque Te, and the transmission gear ratio $\gamma_{cvt}$, belongs to the range β, the ECU 1 outputs the instruction signal for engaging the dog clutch $D_1$ (step S6). For example, control processing in this step S6 is configured that the instruction means 102 outputs the instruction signal for engaging the dog clutch $D_1$ to the appropriate actuator that actuates the dog clutch $D_1$ in the case where the determination means 101 determines the engagement of the dog clutch $D_1$ during the CVT travel mode. That is, in the third determination means, it may be configured to output the instruction signal for engaging the dog clutch $D_1$ in the case where it is determined that the transmission gear ratio $\gamma_{cvt}$ is higher than the specified transmission gear ratio $\gamma_{cvt2}$ or in the case where it is determined that the vehicle speed V is higher than the specified vehicle speed $V_2$. Then, the ECU 1 is configured that the instruction means 102 outputs the instruction signal for engaging the dog clutch $D_1$, so as to terminate this control processing. It should be noted that the ECU 1 may be configured to terminate this control processing in the case where a detection signal for detecting that the dog clutch $D_1$ has been engaged by the control processing in step S6 is input by the specified sensor S, such as the above-described stroke sensor.

Figure 6:
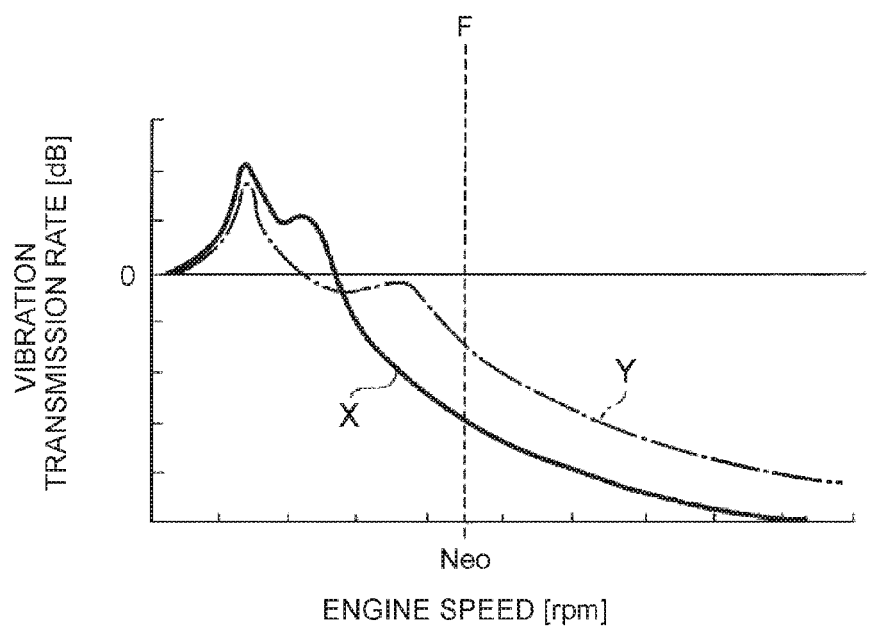
FIG. 6 is an explanatory view for indicating transition of a vibration transmission rate that is changed in accordance with an engine speed by dividing into a case where the transmission mechanism is coupled as a rotational inertia body to the torque transmission path in a CVT travel mode and a case where the transmission mechanism is decoupled from the torque transmission path.
Figure 7:
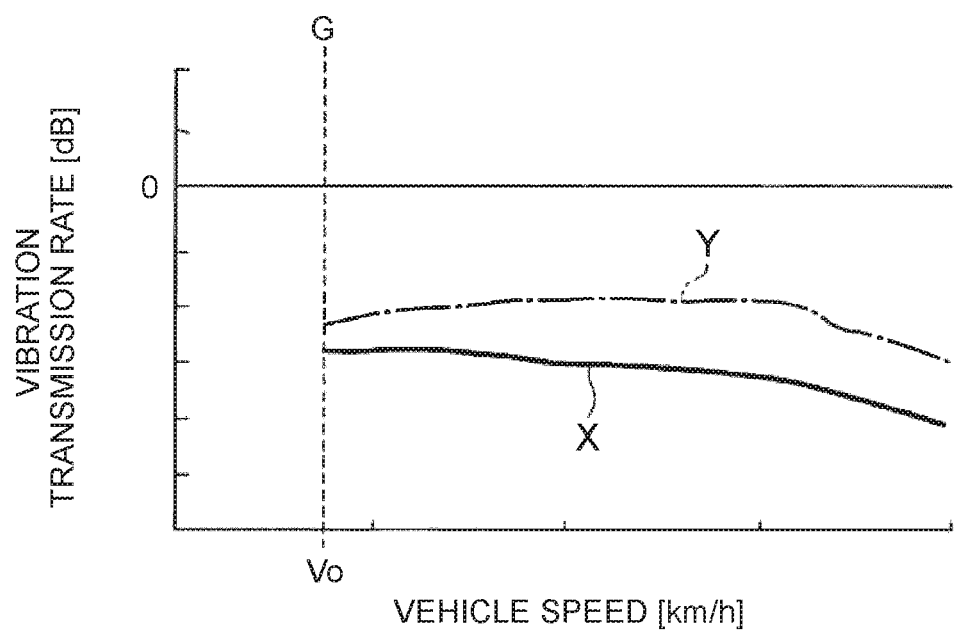
FIG. 7 is an explanatory view for indicating the transition of the vibration transmission rate that is changed in accordance with a vehicle speed by dividing into the case where the transmission mechanism is coupled as the rotational inertia body to the torque transmission path in the CVT travel mode and the case where the transmission mechanism is decoupled from the torque transmission path.
Figure 8:
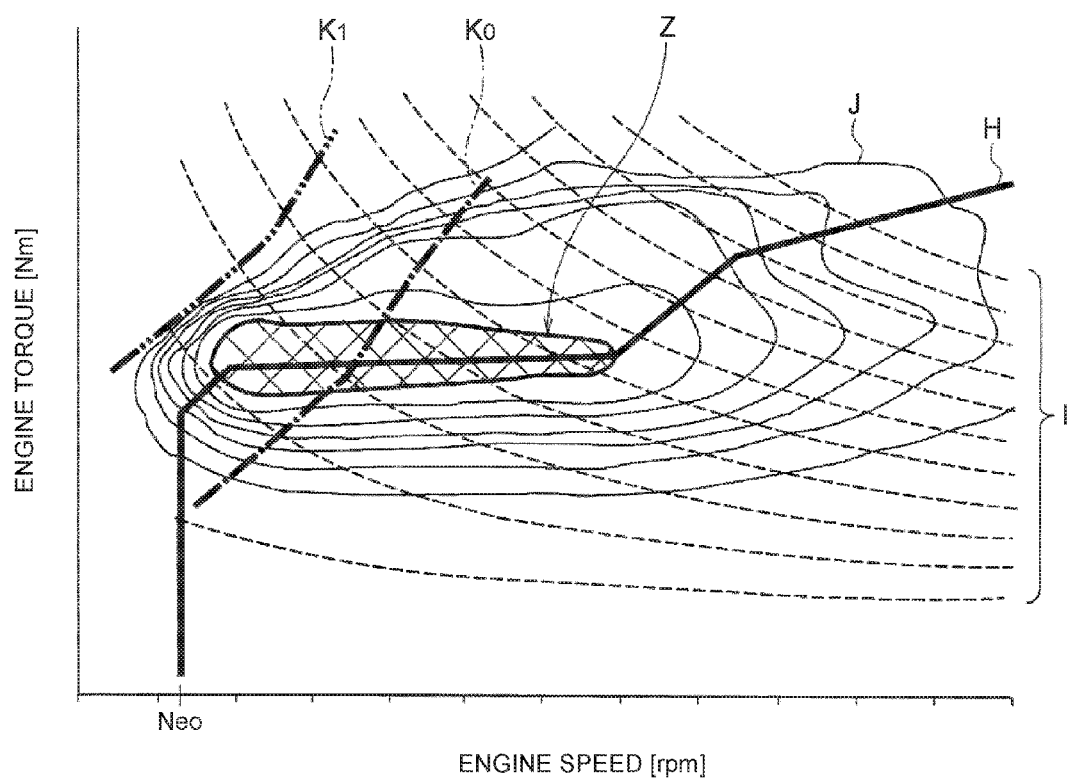
FIG. 8 is an explanatory view that indicates a map for controlling an operation point based on the engine speed and engine torque in the CVT travel mode.

Just as described, the dog clutch $D_1$, which is arranged on the relatively downstream side of the clutches arranged in series in the second transmission path, is engaged during the CVT travel, and the transmission mechanism 40, which can rotate idle, is coupled as the rotational inertia body to the first transmission path and particularly to the output shaft 12. In this way, as shown in FIG. 6 to FIG. 8, the vibration that is originated from the engine 2 and is transmitted to the first transmission path can be dampened. In FIG. 6 and FIG. 7, the transition of a vibration transmission rate that corresponds to the engine speed Ne or the vehicle speed V in the case where the transmission mechanism 40 is joined to the first transmission path is indicated by a bold line X, and the transition of the vibration transmission rate that corresponds to the engine speed Ne or the vehicle speed V in the case where the transmission mechanism 40 is decoupled from the first transmission path is indicated by a one-dot chain line Y.

As shown in FIG. 6, the bold line X is constantly shifted to have the lower vibration transmission rate than the one-dot chain line Y when the engine speed Ne is on a high-speed side of an operation boundary line F. The operation boundary line F indicated by a dotted line in FIG. 6 is a boundary line that represents a state where the vehicle runs by the output torque of the engine 2, a lock-up state of the torque converter 6, an idle speed $Ne_0$ of the engine 2, and the like. That is, an operation boundary line that indicates a state where a travel by the engine 2 can be made is indicated. Accordingly, when the engine speed Ne is on a high-speed side of the idle speed $Ne_0$ during the CVT travel mode, the vibration transmitted to the first transmission path can be dampened more by joining the transmission mechanism 40, which will become the rotational inertia body, to the first transmission path than a case where the transmission mechanism 40 is decoupled from the first transmission path.

In addition, as shown in FIG. 7, the bold line X is constantly shifted to have the lower vibration transmission rate than the one-dot chain line Y when the vehicle speed V is on a high vehicle speed side of a boundary line G. The boundary line G indicated by a dotted line in FIG. 7 is a boundary line between the lock-up state of the torque converter 6 and a fluid transmission state, that is, a boundary line that represents a vehicle speed $V_0$ when the lock-up clutch 6e is engaged. That is, the high vehicle speed side of the boundary line G indicated in FIG. 7 indicates a travel range in a state where the engine 2 and the input shaft 7 are directly connected. Meanwhile, a low vehicle speed side of the boundary line G indicates a state where the torque converter 6 transmits the torque via the fluid. Accordingly, in the case where the vehicle speed V is on a high vehicle speed side of the vehicle speed $V_0$ at which the torque converter 6 is subjected to lock-up engagement, the vibration that is transmitted to the first transmission path can be dampened more by joining the transmission mechanism 40 to the first transmission path than the case where the transmission mechanism 40 is disconnected from the first transmission path. It should be noted that, since the torque converter 6 transmits the torque via the fluid on the low vehicle speed side of the boundary line G, the vibration that is originated from the engine 2 is dampened by the fluid.

Furthermore, FIG. 8 shows a control map for controlling an operation point that is based on the engine speed Ne and the engine torque Te to be in an operation range with the excellent fuel economy in the CVT travel mode. In FIG. 8, a minimum fuel consumption line H is indicated by a bold line, an equal output line I in the engine 2 is indicated by a dotted line, an equal fuel economy consumption rate line J is indicated by an annular curve, and an operation range used in the CVT travel mode (a CVT travel range) Z is indicated by a shaded range. The CVT travel range Z includes a low efficient fuel consumption rate range. Furthermore, a first boundary line $K_0$ that is indicated by a one-dot chain line in FIG. 8 indicates a boundary line of achievement of performance with respect to the noise and the vibration (NV performance) in the state where the transmission mechanism 40 is decoupled from the first transmission path. In addition, a second boundary line $K_1$ that is indicated by a two-dot chain line in FIG. 8 indicates a boundary line of the achievement of the performance with respect to the noise and the vibration (the NV performance) in the state where the transmission mechanism 40 is coupled to the first transmission path. That is, the boundary line of the NV performance during the CVT travel mode becomes the first boundary line $K_0$ in the case where the transmission mechanism 40 is decoupled from the first transmission path, and becomes the second boundary line $K_1$ in the case where the transmission mechanism 40 is coupled to the first transmission path.

For example, in the state where the transmission mechanism 40 is decoupled from the first transmission path, a low-speed side of the first boundary line $K_0$ of the engine speed Ne or a high torque side of the first boundary line $K_0$ of the engine torque Te becomes a range (an NV performance unachieved range) where the noise, such as booming noise, a front-rear vibration and an up-down vibration of the vehicle, and the like are excessively generated. Accordingly, in the decoupled state of the transmission mechanism 40, it is desirable to control the operation point to have the engine speed Ne and the engine torque Te that belong to an operation range (an NV performance achieved range) on a right side of the first boundary line $K_0$. Meanwhile, in the state where the transmission mechanism 40 is coupled to the first transmission path, a low-speed side of the second boundary line $K_1$ of the engine speed Ne or a high torque side of the second boundary line $K_1$ of the engine torque Te becomes the range (the NV performance unachieved range) where the noise, such as the booming noise, the front-rear vibration and the up-down vibration of the vehicle, and the like are excessively generated. Accordingly, in the state where the transmission mechanism 40 is coupled as the rotational inertia body to the first transmission path, it is desirable to control the operation point to have the engine speed Ne and the engine torque Te that belong to an operation range (the NV performance achieved range) on a right side of the second boundary line $K_1$.

More specifically, as shown in FIG. 8, in the state where the transmission mechanism 40 is decoupled from the first transmission path, the first boundary line $K_0$ as a reference line crosses the optimum fuel consumption line H, and the range (the NV performance unachieved range) where the vibration and the noise are excessively generated is significantly included in the CVT travel range Z. On the contrary, in the state where the transmission mechanism 40 is coupled as the rotational inertia body to the first transmission path, the second boundary line $K_1$ as the reference line does not cross the optimum fuel consumption line H, and a whole area of the CVT travel range Z is included in the range (the NV performance achieved range) where the noise is unlikely to be generated. Accordingly, during the CVT travel, the operation point that is defined by the engine speed Ne and the engine torque Te is set to be in the CVT travel range Z of the low efficient fuel consumption rate range. Thus, the vehicle is brought into the operation state with the excellent fuel economy, and the vibration that is transmitted to the first transmission path can be dampened. It should be noted that, as shown in FIG. 8, a reason why the second boundary line $K_1$ is located on the low-speed side and the high torque side of the first boundary line $K_0$ is because the vibration transmission rate is decreased more by coupling the transmission mechanism 40 as the rotational inertia body to the first transmission path than the case where the transmission mechanism 40 is decoupled, as shown in FIG. 6 and FIG. 7, despite a fact that the engine speed Ne or the engine torque Te is the same.

As described above, according to the control device for a vehicle in the first specified example, the transmission mechanism that can rotate idle can be coupled to the output shaft when the dog clutch, which is arranged on the relatively downstream side of the plural clutch mechanisms arranged in series in the transmission path including the transmission mechanism, is engaged during the CVT travel. Accordingly, the transmission mechanism functions as the rotational inertia body, and the inertial moment by the transmission mechanism can thereby act on the output shaft. Thus, the vibration that is originated from the engine and transmitted to the torque transmission path can be dampened. That is, the transmission mechanism, which is a functional member for forming the torque transmission path, can be used as a functional member for dampening the vibration.

In addition, the transmission mechanism in the first specified example is set to have the transmission gear ratio (the speed reduction gear ratio) at which the speed reducing action is generated in the case where the torque is transmitted from the input shaft toward the output shaft. Accordingly, when the torque of the output shaft is applied to the transmission mechanism, the equivalent inertial moment by the transmission mechanism that acts on the output shaft has the relatively large value, and thus the vibration that is transmitted to the output shaft can effectively be dampened. That is, the equivalent inertial moment by the transmission mechanism can effectively be used in accordance with the magnitude of the transmission gear ratio (the speed reduction gear ratio) by the transmission mechanism. Furthermore, since the transmission mechanism has the same weight and the transmission mechanism is coupled to the output shaft, the large inertial moment can act on the output shaft by using the speed reduction gear ratio. Accordingly, there is no need to increase a weight of an inertial mass body in order to increase the inertial force, and the increases in weight and size of the unit, such as the transaxle, can be prevented.

Furthermore, in the clutch mechanisms arranged in series in the transmission path that includes the transmission mechanism, both of the first clutch mechanism that is arranged on the upstream side and the dog clutch that is arranged on the downstream side are disengaged. Thus, the rotation of the transmission mechanism with the input shaft and the output shaft is prevented during the CVT travel. That is, since the transmission mechanism can be decoupled from the torque transmission path during the CVT travel, power loss by the transmission mechanism can be decreased, and deterioration of durability of the transmission mechanism can be suppressed.

Moreover, in the forward/reverse travel switching mechanism that is constructed of the planetary gear unit, while the torque from the input shaft is transmitted to the sun gear as the input element, the ring gear as the reaction element and the carrier as the output element are in the freely rotating states. Alternatively, the rotational speed difference among the rotation elements is decreased due to the integral rotation of the entirety. Thus, the power loss and the deterioration of the durability of the forward/reverse travel switching mechanism can be suppressed, and the noise and the vibration can be suppressed.

Next, a description will be made on modified examples of the powertrain that can be the target of the invention with reference to FIG. 9 to FIG. 26. Each of those modified examples includes a powertrain in which each of the clutch mechanisms $C_1$, $C_2$, $D_1$, the brake mechanism $B_1$, and the forward/reverse travel switching mechanism are differently arranged from those in the above-described first specified example and are also arranged on any rotational shaft of the input shaft, the counter shaft, and the output shaft. It should be noted that, in the description herein, a similar configuration to that of the first specified example shown in FIG. 2 will not be described and the reference numerals thereof are used. Furthermore, also in the modified examples described herein, in the case where a similar configuration is provided, the description will not be made, and the reference numerals are used. FIG. 9 to FIG. 15 respectively show powertrains in a second specified example to an eighth specified example, and show examples in which the first clutch mechanism $C_1$ is arranged on the upstream side and the dog clutch $D_1$ is arranged on the downstream side. Meanwhile, FIG. 16 to FIG. 25 respectively show powertrains in a ninth specified example to an eighteenth specified example, and show examples in which the dog clutch $D_1$ is arranged on the upstream side and the first clutch mechanism $C_1$ is arranged on the downstream side.

Figure 9:
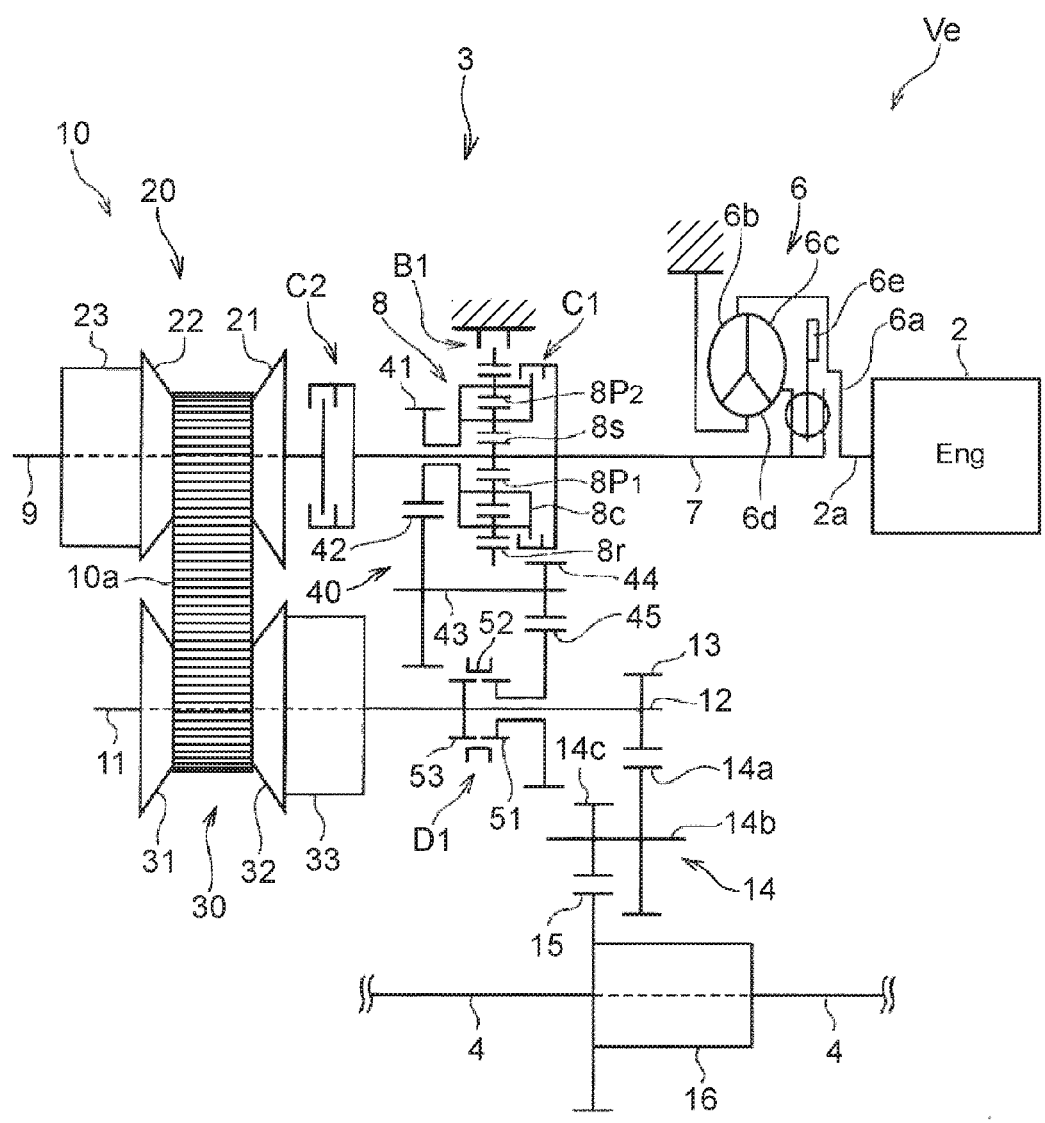
FIG. 9 is a skeletal view that shows a second specified example of the powertrain that can be the target of the invention.

The powertrain in the second specified example shown in FIG. 9 is configured that the rotational shaft on which the second clutch mechanism $C_2$ is arranged differs from that in the first specified example shown in FIG. 2. In the example shown in FIG. 9, the first and second clutch mechanisms $C_1$, $C_2$ and the forward/reverse travel switching mechanism 8 are arranged on the same axis as the input shaft 7, and the dog clutch $D_1$ is arranged on the output shaft 12. The second clutch mechanism $C_2$ is a clutch mechanism that is configured to selectively couple the input shaft 7 and the primary shaft 9 and that selectively transmits or blocks the torque between the input shaft 7 and the CVT 10.

Figure 10:
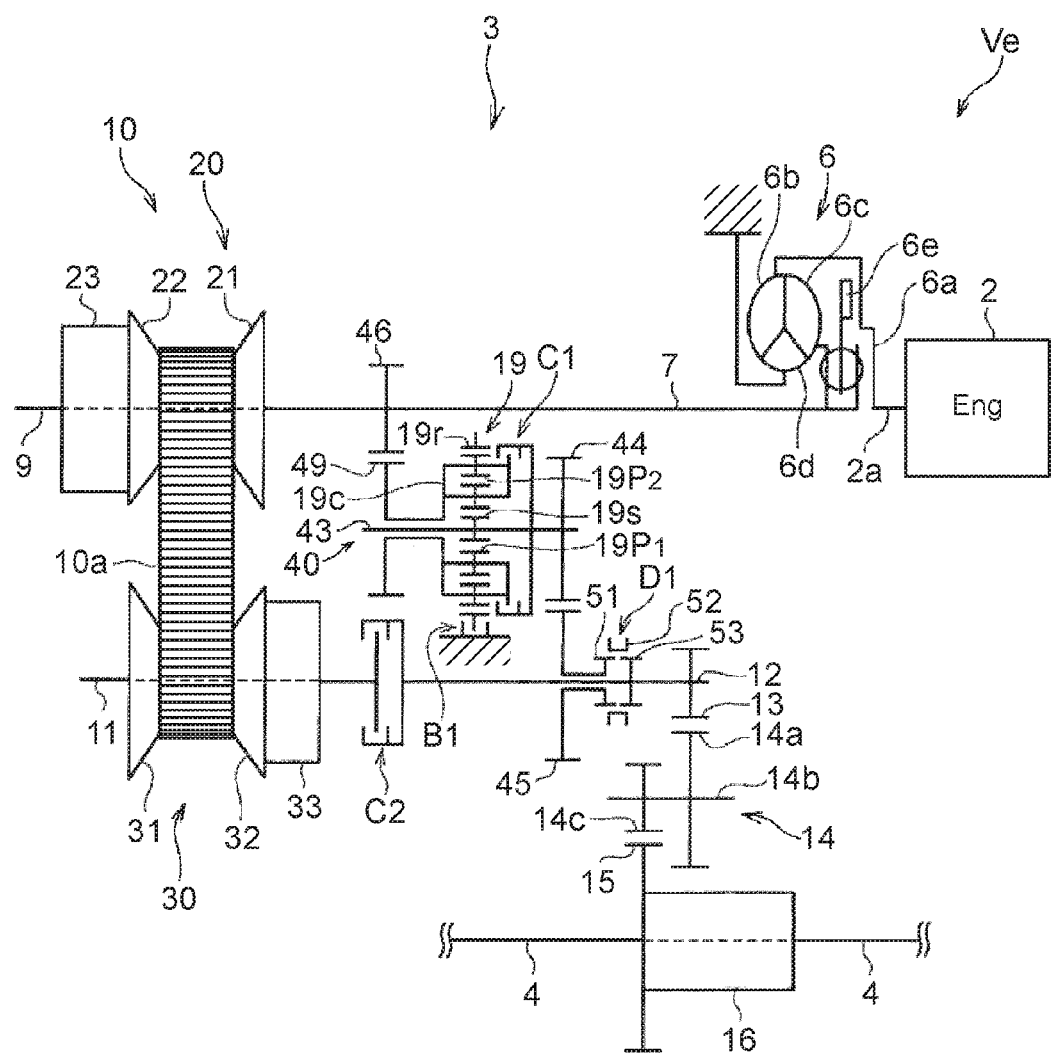
FIG. 10 is a skeletal view that shows a third specified example of the powertrain that can be the target of the invention.

The powertrain in the third specified example shown in FIG. 10 is configured that the rotational shaft on which the first clutch mechanism $C_1$ and a forward/reverse travel switching mechanism 19 are arranged and the rotational shaft on which the dog clutch $D_1$ is arranged differ from those in the first specified example shown in FIG. 2. In the example shown in FIG. 10, the first clutch mechanism $C_1$ and the forward/reverse travel switching mechanism 19 are arranged on the counter shaft 43, the second clutch mechanism $C_2$ and the dog clutch $D_1$ are arranged on the same axis as the output shaft 12. Similar to the forward/reverse travel switching mechanism 8 that is arranged on the input shaft 7, the forward/reverse travel switching mechanism 19 that is arranged on the counter shaft 43 is constructed of a planetary gear unit of a double pinion type that includes three rotation elements. More specifically, a carrier 19c that is integrated with a counter driven gear 49 constitutes the input element, a sun gear 19s that is integrated with the counter shaft 43 constitutes the output element, and a ring gear 19r constitutes the reaction element. The counter driven gear 49 is formed to be hollow, is fitted to the counter shaft 43 in a manner capable of relatively rotating therewith, and constantly meshes with a drive gear 46 that is integrated with the input shaft 7. For example, in the case where the first clutch mechanism $C_1$ is engaged, the carrier 19c as the input element and the sun gear 19s as the output element are coupled, and the entire forward/reverse travel switching mechanism 19 as the planetary gear unit rotates integrally. In this case, the forward/reverse travel switching mechanism 19 integrally rotates with the counter shaft 43. Accordingly, in a torque transmission path that stretches from the engine 2 to the drive wheels 5 through the transmission mechanism 40, the first gear pair that includes the drive gear 46 and the counter driven gear 49 is arranged on an upstream side of the forward/reverse travel switching mechanism 19, and the second gear pair that includes the counter drive gear 44 and the driven gear 45 is arranged on a downstream side of the forward/reverse travel switching mechanism 19. In addition, the dog clutch $D_1$ shown in FIG. 10 is configured to selectively couple the driven gear 45 and the output shaft 12. Thus, in the example shown in FIG. 10, the dog clutch $D_1$ is included in the clutch mechanism that selectively transmits or blocks the torque between the output shaft 12 and the transmission mechanism 40.

Figure 11:
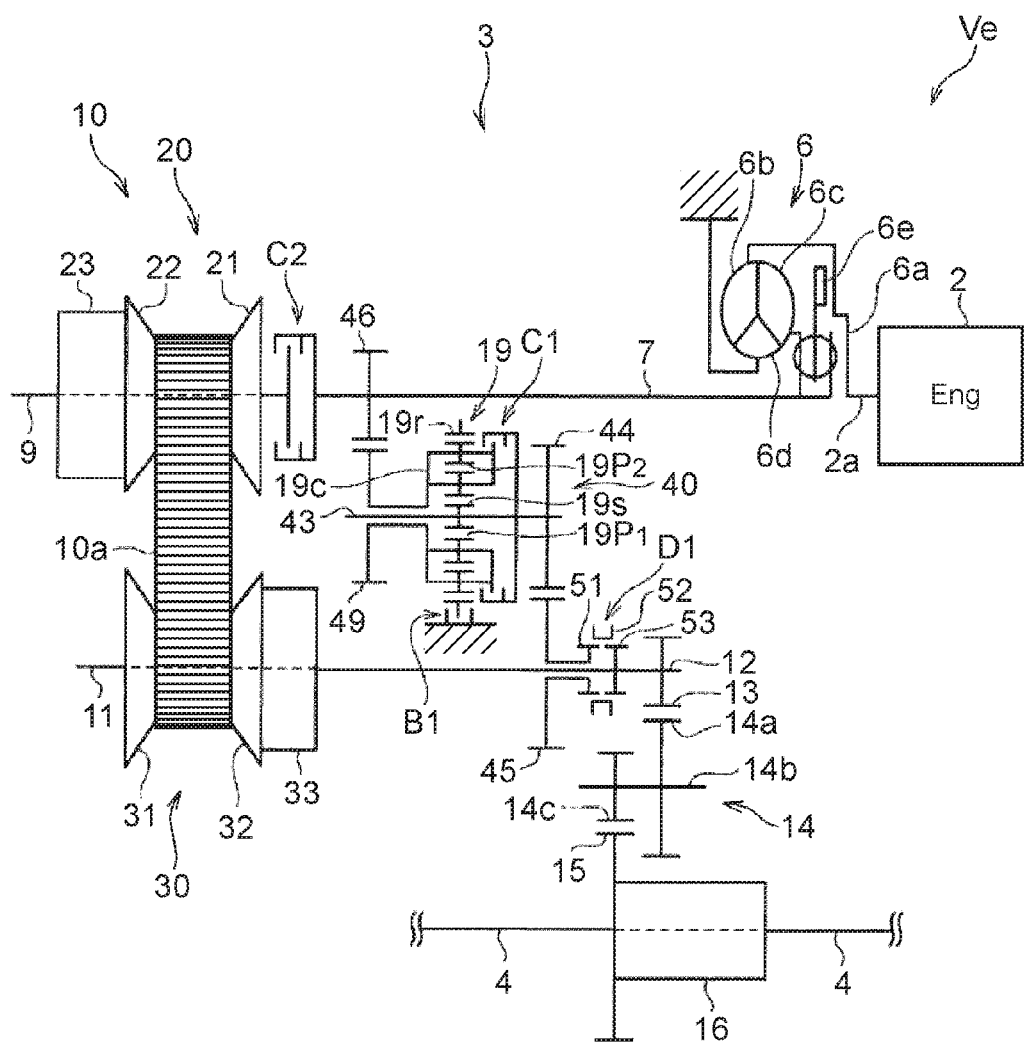
FIG. 11 is a skeletal view that shows a fourth specified example of the powertrain that can be the target of the invention.

The powertrain in the fourth specified example shown in FIG. 11 is configured that the rotational shaft on which the second clutch mechanism $C_2$ is arranged differs from that in the third specified example shown in FIG. 10. In the example shown in FIG. 11, the second clutch mechanism $C_2$ is arranged on the same axis as the input shaft 7, the first clutch mechanism $C_1$ and the forward/reverse travel switching mechanism 19 are arranged on the counter shaft 43, and the dog clutch $D_1$ is arranged on the output shaft 12. The second clutch mechanism $C_2$ is configured to selectively couple the input shaft 7 and the primary shaft 9.

Figure 12:
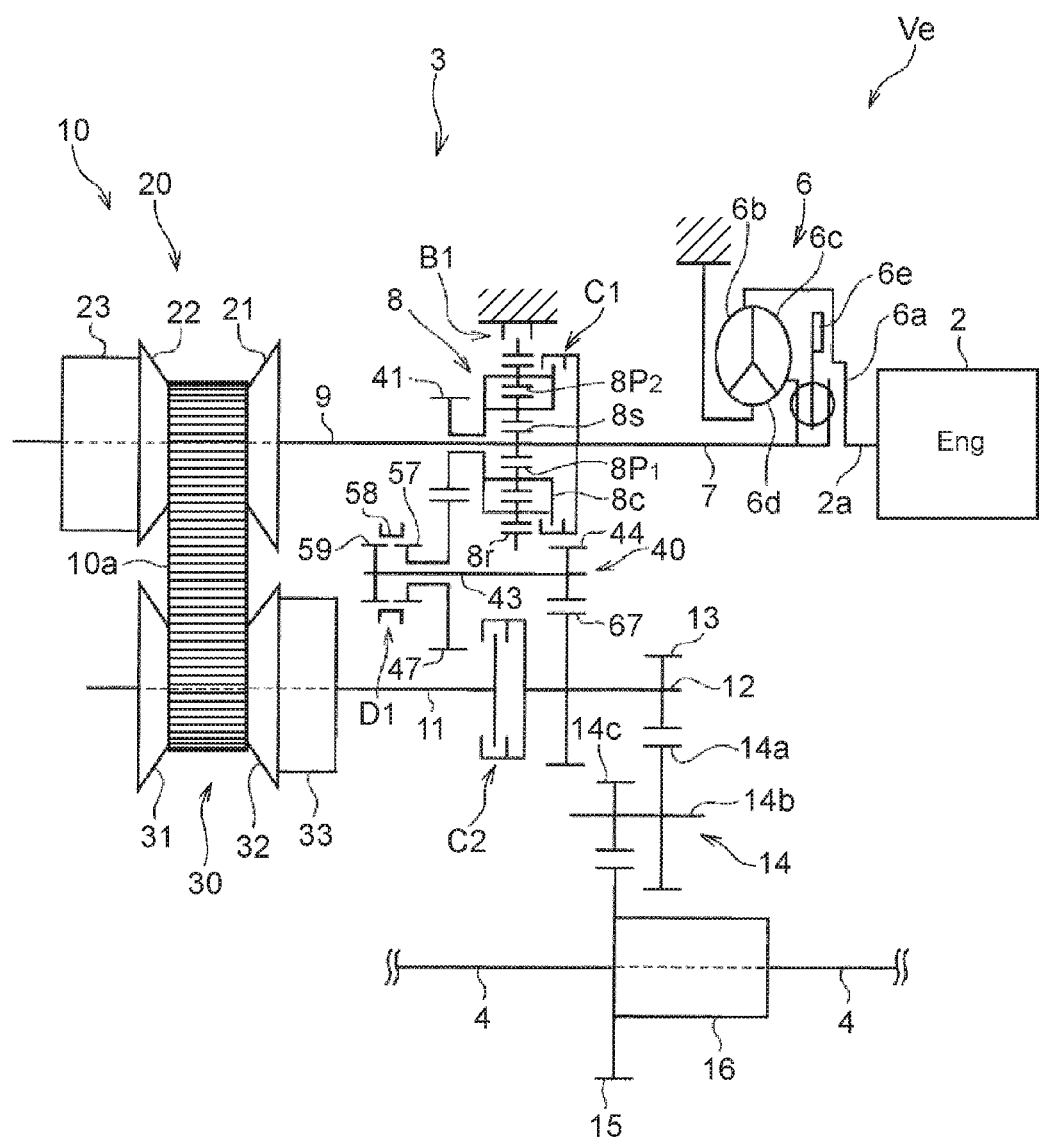
FIG. 12 is a skeletal view that shows a fifth specified example of the powertrain that can be the target of the invention.

The powertrain in the fifth specified example shown in FIG. 12 is configured that the rotational shaft on which the dog clutch $D_1$ is arranged differs from that in the first specified example shown in FIG. 2. In the example shown in FIG. 12, the first clutch mechanism $C_1$ and the forward/reverse travel switching mechanism 8 are arranged on the same axis as the input shaft 7, the dog clutch $D_1$ is arranged on the counter shaft 43, and the second clutch mechanism $C_2$ is arranged on the same axis as the output shaft 12. The dog clutch $D_1$ is configured to selectively couple a counter driven gear 47 that is formed to be hollow and the counter shaft 43. The counter driven gear 47 is fitted to the counter shaft 43 in a manner capable of relatively rotating therewith. The dog clutch $D_1$ that is shown in FIG. 12 is configured to couple the transmission mechanism 40 to the output shaft 12 by meshing a spline that is formed on an inner circumferential surface of a sleeve 58 with a spline that is formed on a clutch gear 57 and with a spline formed on a hub 59, the transmission mechanism 40 including the first gear pair that includes the drive gear 41 and the counter driven gear 47, the sleeve 58 being able to move in the axial direction of the counter shaft 43, the clutch gear 57 being integrated with the counter driven gear 47, and the hub 59 being integrated with the counter shaft 43.

Figure 13:
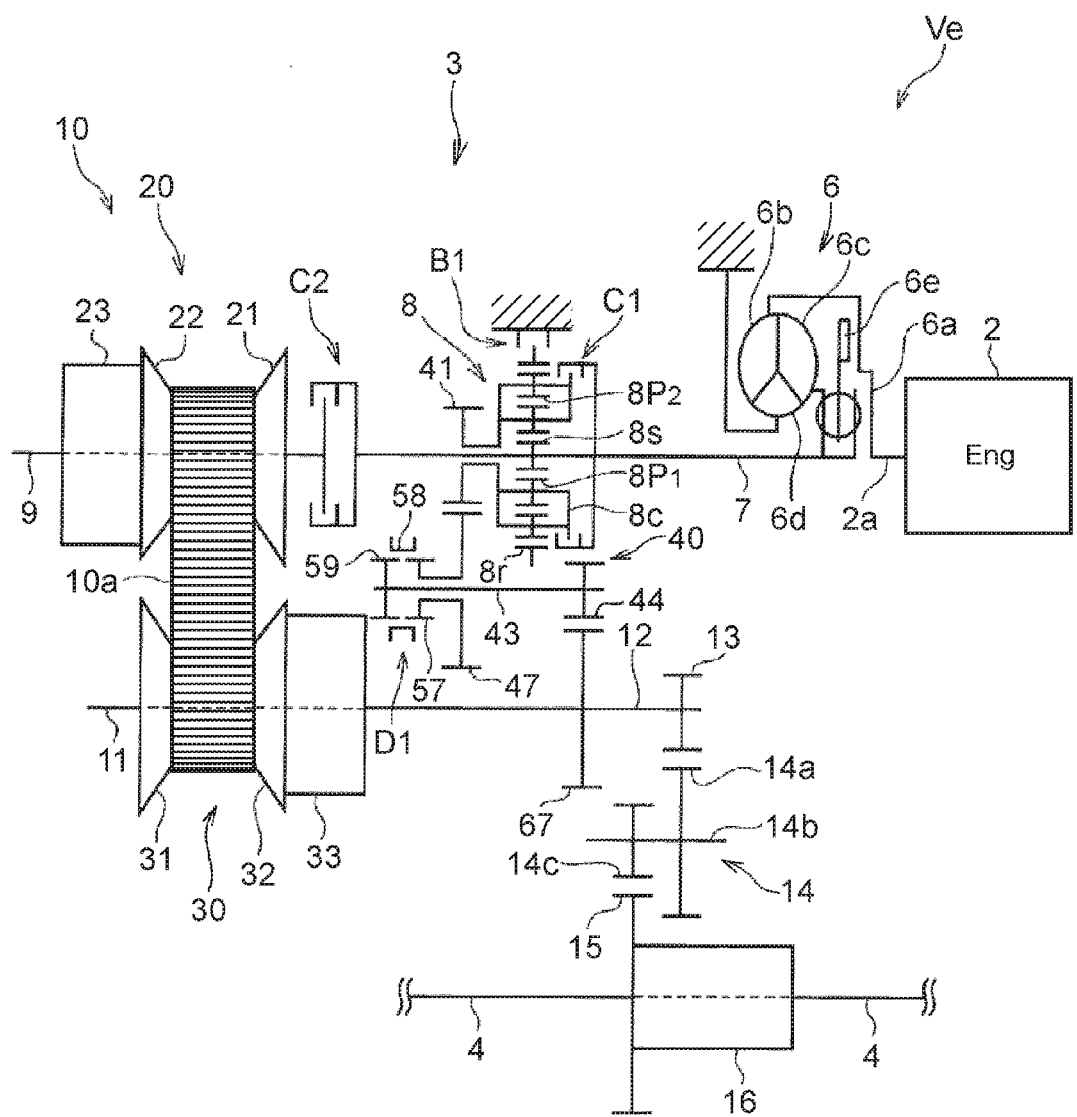
FIG. 13 is a skeletal view that shows a sixth specified example of the powertrain that can be the target of the invention.

The powertrain in the sixth specified example shown in FIG. 13 is configured that the rotational shaft on which the second clutch mechanism $C_2$ is arranged differs from that in the fifth specified example shown in FIG. 12. In the example shown in FIG. 13, the first and second clutch mechanisms $C_1$, $C_2$ and the forward/reverse travel switching mechanism 8 are arranged on the same axis as the input shaft 7, and the dog clutch $D_1$ is arranged on the counter shaft 43. The dog clutch $D_1$ is configured to selectively couple the counter driven gear 47 and the counter shaft 43.

Figure 14:
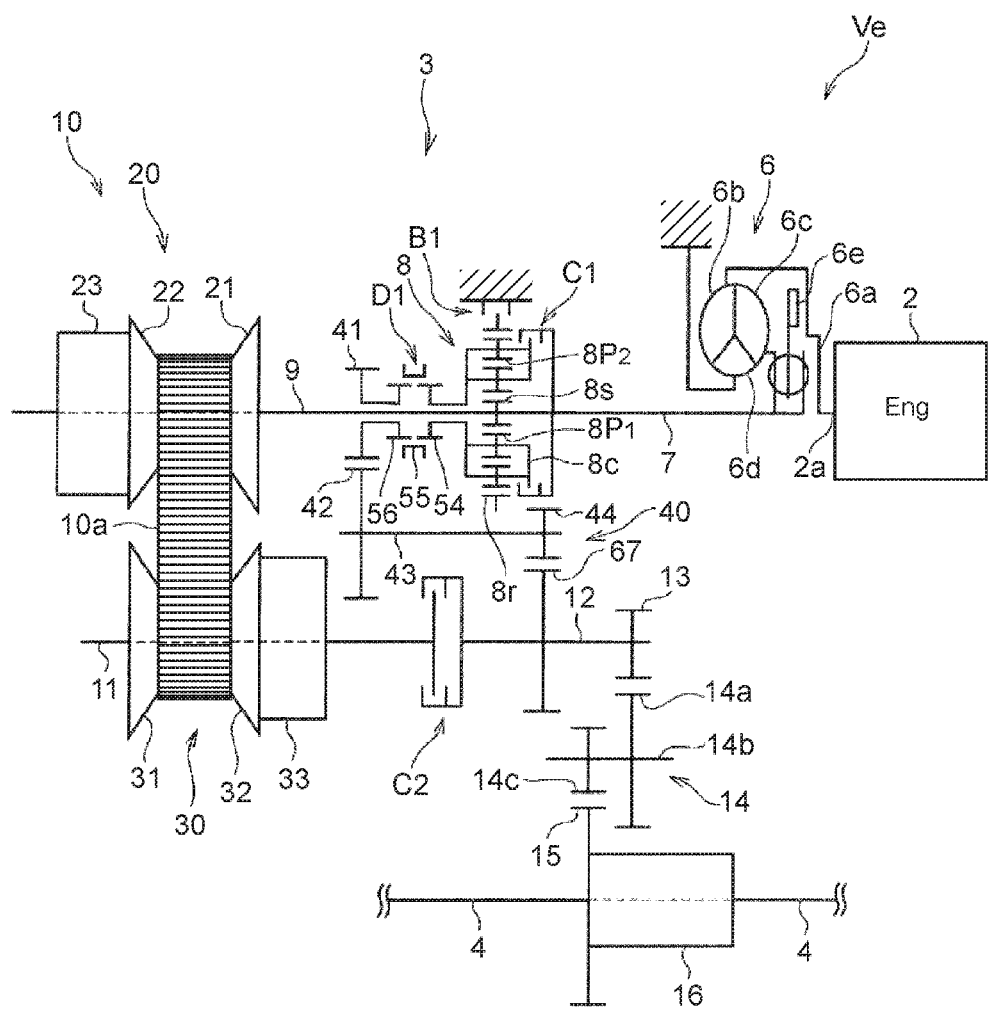
FIG. 14 is a skeletal view that shows a seventh specified example of the powertrain that can be the target of the invention.

The powertrain in the seventh specified example shown in FIG. 14 is configured that the rotational shaft on which the dog clutch $D_1$ is arranged differs from that in the first specified example shown in FIG. 2. In the example shown in FIG. 14, the first clutch mechanism $C_1$, the dog clutch $D_1$, and the forward/reverse travel switching mechanism 8 are arranged on the same axis as the input shaft 7, and the second clutch mechanism $C_2$ is arranged on the same axis as the output shaft 12. The second clutch mechanism $C_2$ is a mechanism that is configured to selectively couple the output shaft 12 and the secondary shaft 11 and that selectively transmits or blocks the torque between the output shaft 12 and the CVT 10. The dog clutch $D_1$ is configured to selectively couple the carrier 8c as the output element in the forward/reverse travel switching mechanism 8 and the drive gear 41. The dog clutch $D_1$ that is shown in FIG. 14 is configured to couple the carrier 8c as the output element of the planetary gear unit to the drive gear 41 by meshing a spline that is formed on an inner circumferential surface of a sleeve 55 with a spline that is formed on a clutch gear 54 on an input side and a spline that is formed on a clutch gear 56 on an output side, the sleeve 55 being able to move in the axial direction of the input shaft 7, the clutch gear 54 being integrated with the carrier 8c, and the clutch gear 56 being integrated with the drive gear 41.

Figure 15:
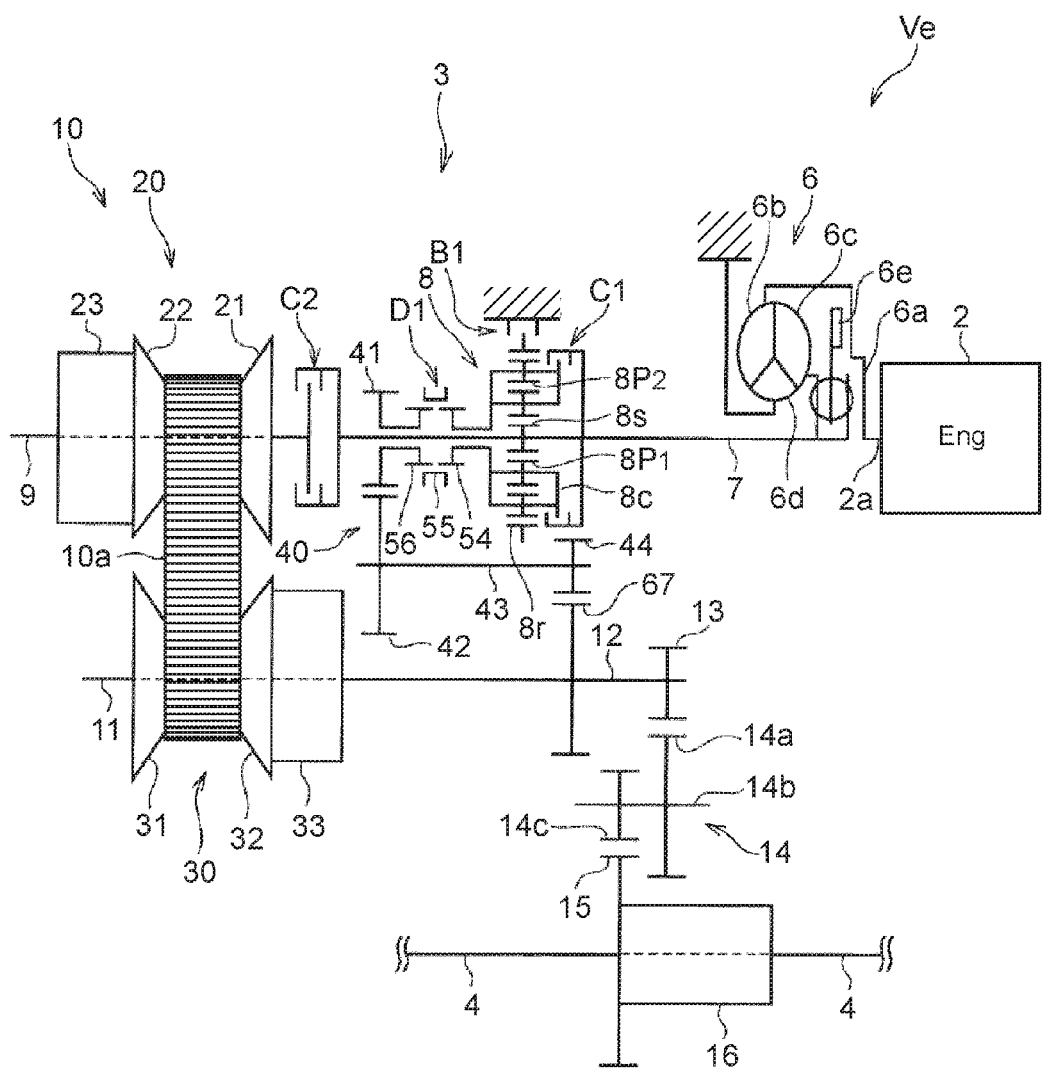
FIG. 15 is a skeletal view that shows an eighth specified example of the powertrain that can be the target of the invention.

The powertrain in the eighth specified example shown in FIG. 15 is configured that the rotational shaft on which the second clutch mechanism $C_2$ is arranged differs from that in the seventh specified example shown in FIG. 14. In the example shown in FIG. 15, each of the clutch mechanisms $C_1$, $C_2$, $D_1$ and the forward/reverse travel switching mechanism 8 are arranged on the same axis as the input shaft 7. The second clutch mechanism $C_2$ is a clutch mechanism that is configured to selectively couple the input shaft 7 and the primary shaft 9 and that selectively transmits or blocks the torque between the input shaft 7 and the CVT 10. The dog clutch $D_1$ is configured to selectively couple the carrier 8c as the output element in the forward/reverse travel switching mechanism 8 and the drive gear 41.

Figure 16:
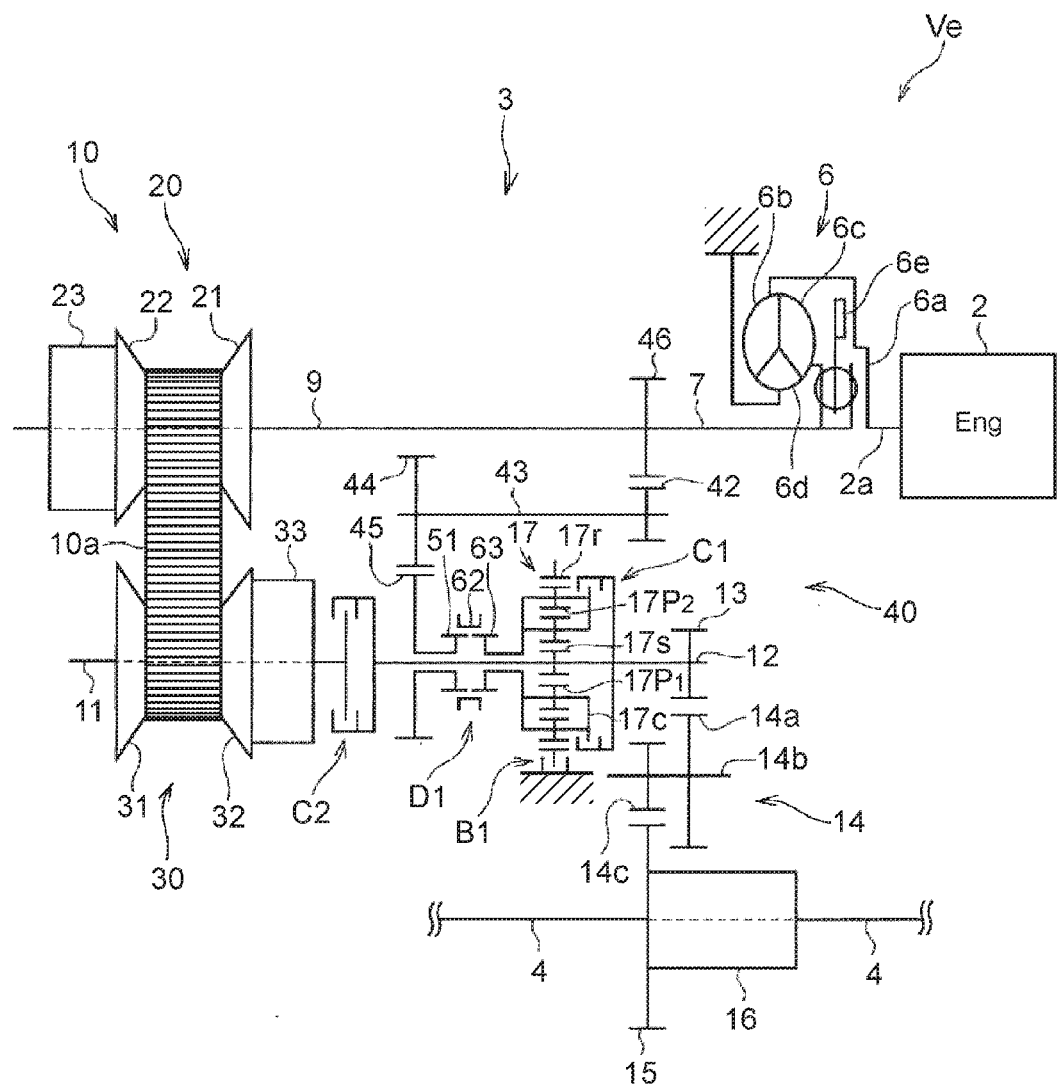
FIG. 16 is a skeletal view that shows a ninth specified example of the powertrain that can be the target of the invention.

The powertrain in the ninth specified example shown in FIG. 16 is configured that the rotational shaft on which the first clutch mechanism $C_1$ and a forward/reverse travel switching mechanism 17 are arranged and the rotational shaft on which the dog clutch $D_1$ is arranged differ from those in the first specified example shown in FIG. 2. In the example shown in FIG. 16, the first clutch mechanism $C_1$, the second clutch mechanism $C_2$, the dog clutch $D_1$, and the forward/reverse travel switching mechanism 17 are arranged on the same axis as the output shaft 12. Similar to the forward/reverse travel switching mechanism 8 that is arranged on the input shaft 7, the forward/reverse travel switching mechanism 17 that is arranged on the output shaft 12 is constructed of a planetary gear unit of the double pinion type that includes three rotation elements. More specifically, a carrier 17c as the input element, a sun gear 17s as the output element, and a ring gear 17r as the reaction element are provided. In the case where the first clutch mechanism $C_1$ is engaged, the carrier 17c as the input element and the sun gear 17s as the output element are coupled, and the entire forward/reverse travel switching mechanism 17 as the planetary gear unit rotates integrally. Furthermore, in this case, the forward/reverse travel switching mechanism 17 integrally rotates with the output shaft 12. Accordingly, in the torque transmission path that stretches from the engine 2 to the drive wheels 5 through the transmission mechanism 40, the transmission mechanism 40 is arranged on the upstream side, and the forward/reverse travel switching mechanism 17 is arranged on the downstream side.

In addition, the dog clutch $D_1$ shown in FIG. 16 is configured to selectively couple the driven gear 45 and the carrier 17c as the input element of the forward/reverse travel switching mechanism 17. The driven gear 45 is formed to be hollow and is fitted to the output shaft 12 in a manner capable of relatively rotating therewith. More specifically, the dog clutch $D_1$ is configured to couple the transmission mechanism 40 to the forward/reverse travel switching mechanism 17 by meshing a spline that is formed on an inner circumferential surface of a sleeve 62 with a spline that is formed on a clutch gear 51 on an input side and with a spline that is formed on a clutch gear 63 on an output side, the sleeve 62 being able to move in the axial direction of the output shaft 12, the clutch gear 51 being integrated with the driven gear 45, and the clutch gear 63 being integrated with the carrier 17c. Accordingly, in the example shown in FIG. 16, the first clutch mechanism $C_1$ and the dog clutch $D_1$ are included in the clutch mechanism that selectively transmits or blocks the torque between the output shaft 12 and the transmission mechanism 40.

Figure 17:
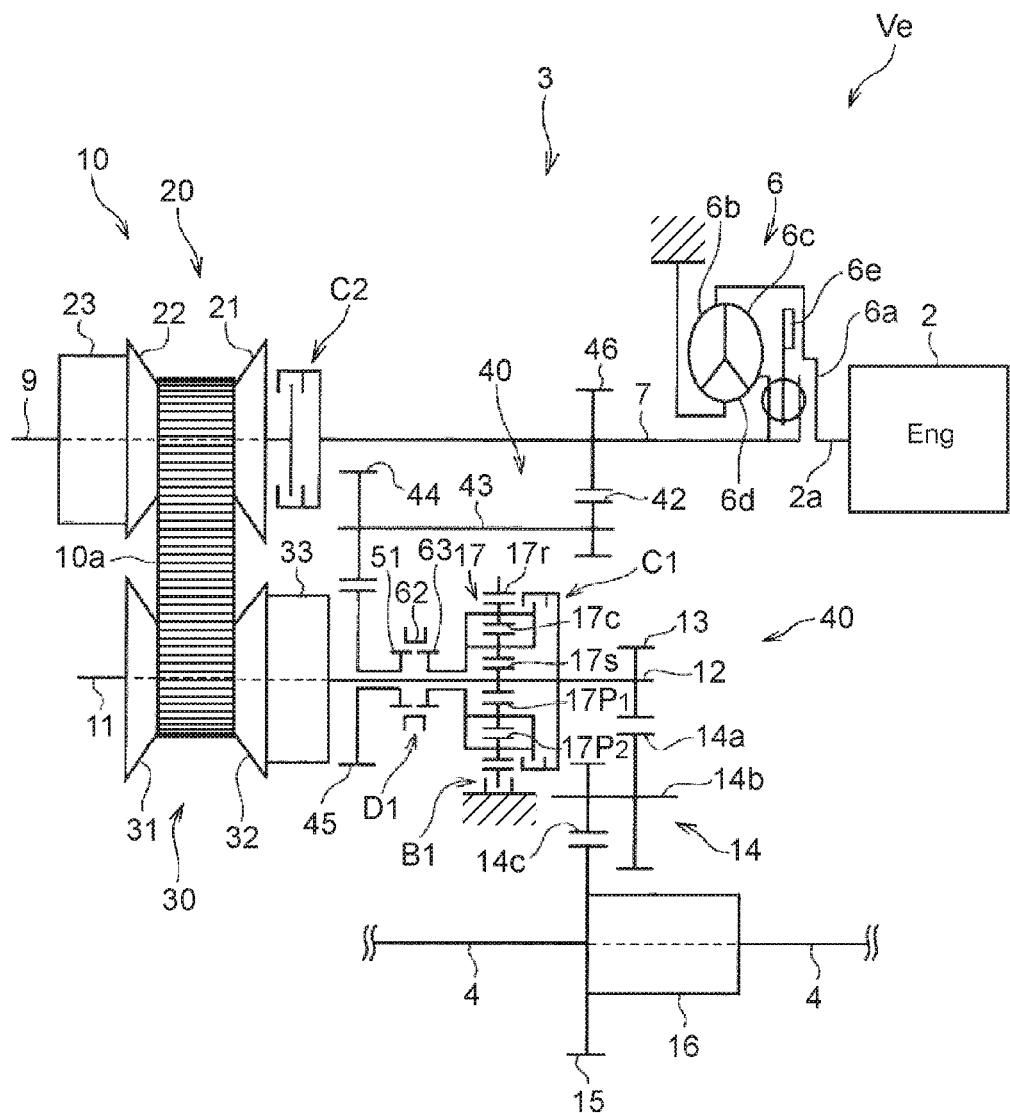
FIG. 17 is a skeletal view that shows a tenth specified example of the powertrain that can be the target of the invention.

The powertrain in the tenth specified example shown in FIG. 17 is configured that the rotational shaft on which the second clutch mechanism $C_2$ is arranged differs from that in the ninth specified example shown in FIG. 16. In the example shown in FIG. 17, the second clutch mechanism $C_2$ is arranged on the same axis as the input shaft 7, and the first clutch mechanism $C_1$, the dog clutch $D_1$, and the forward/reverse travel switching mechanism 17 are arranged on the same axis as the output shaft 12. The dog clutch $D_1$ is configured to selectively couple the driven gear 45 and the carrier 17c as the input element of the forward/reverse travel switching mechanism 17.

Figure 18:
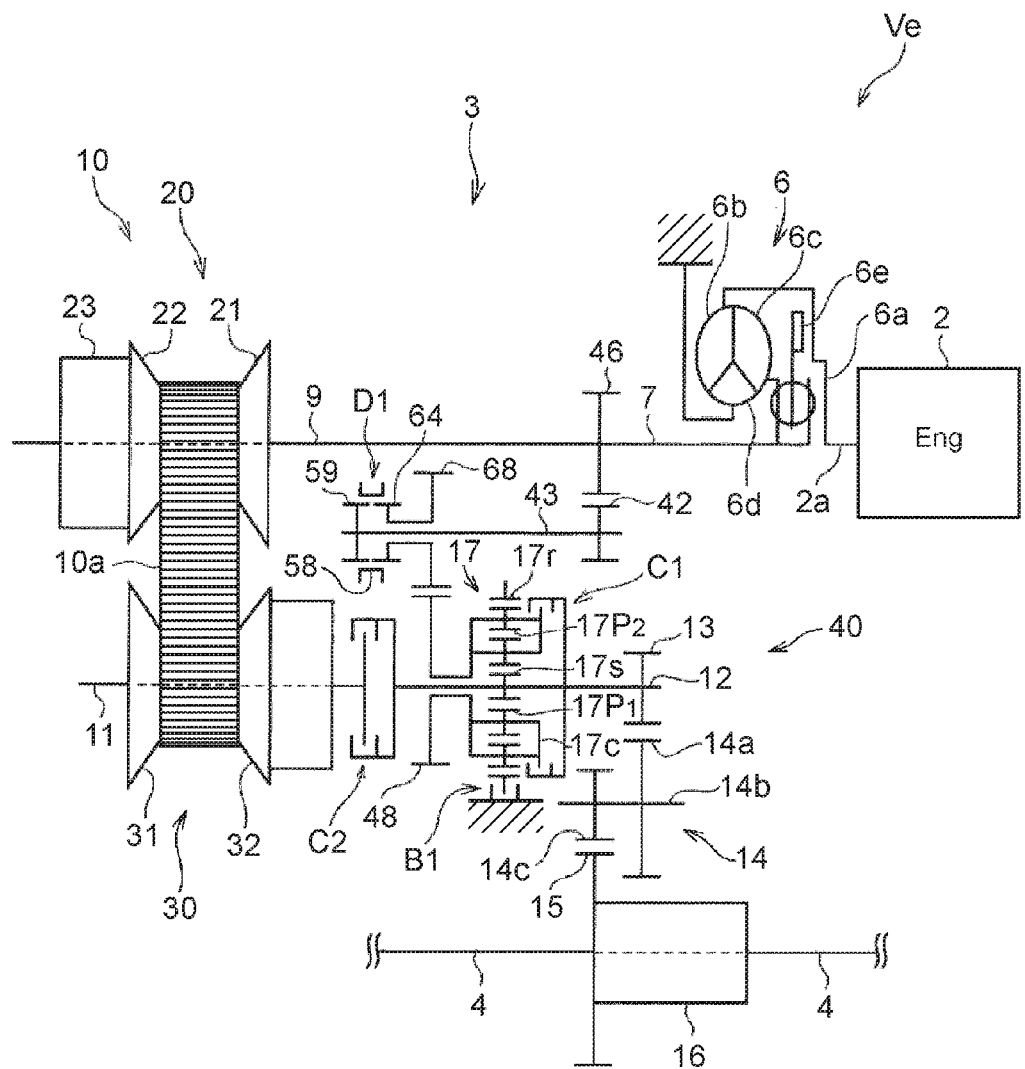
FIG. 18 is a skeletal view that shows an eleventh specified example of the powertrain that can be the target of the invention.

The powertrain in the eleventh specified example shown in FIG. 18 is configured that the rotational shaft on which the dog clutch $D_1$ is arranged differs from that in the ninth specified example shown in FIG. 16. In the example shown in FIG. 18, the dog clutch $D_1$ is arranged on the counter shaft 43, and the first clutch mechanism $C_1$, the second clutch mechanism $C_2$, and the forward/reverse travel switching mechanism 17 are arranged on the same axis as the output shaft 12. The dog clutch $D_1$ is configured to selectively couple a counter drive gear 68 that is formed to be hollow and the counter shaft 43. The counter drive gear 68 is fitted to the counter shaft 43 in a manner capable of relatively rotating therewith. More specifically, the dog clutch $D_1$ is configured to couple the transmission mechanism 40 to the input shaft 7 by meshing a spline that is formed on the inner circumferential surface of the sleeve 58 with a spline formed on the hub 59 and with a spline that is formed on a clutch gear 64, the sleeve 58 being able to move in the axial direction of the counter shaft 43, the hub 59 being integrated with the counter shaft 43, and the clutch gear 64 being integrated with the counter drive gear 68. Accordingly, in the example shown in FIG. 18, the dog clutch $D_1$ is included in the clutch mechanism that selectively transmits or blocks the torque between the transmission mechanism 40 and the input shaft 7, the transmission mechanism 40 including the second gear pair that includes the counter drive gear 68 and a driven gear 48.

Figure 19:
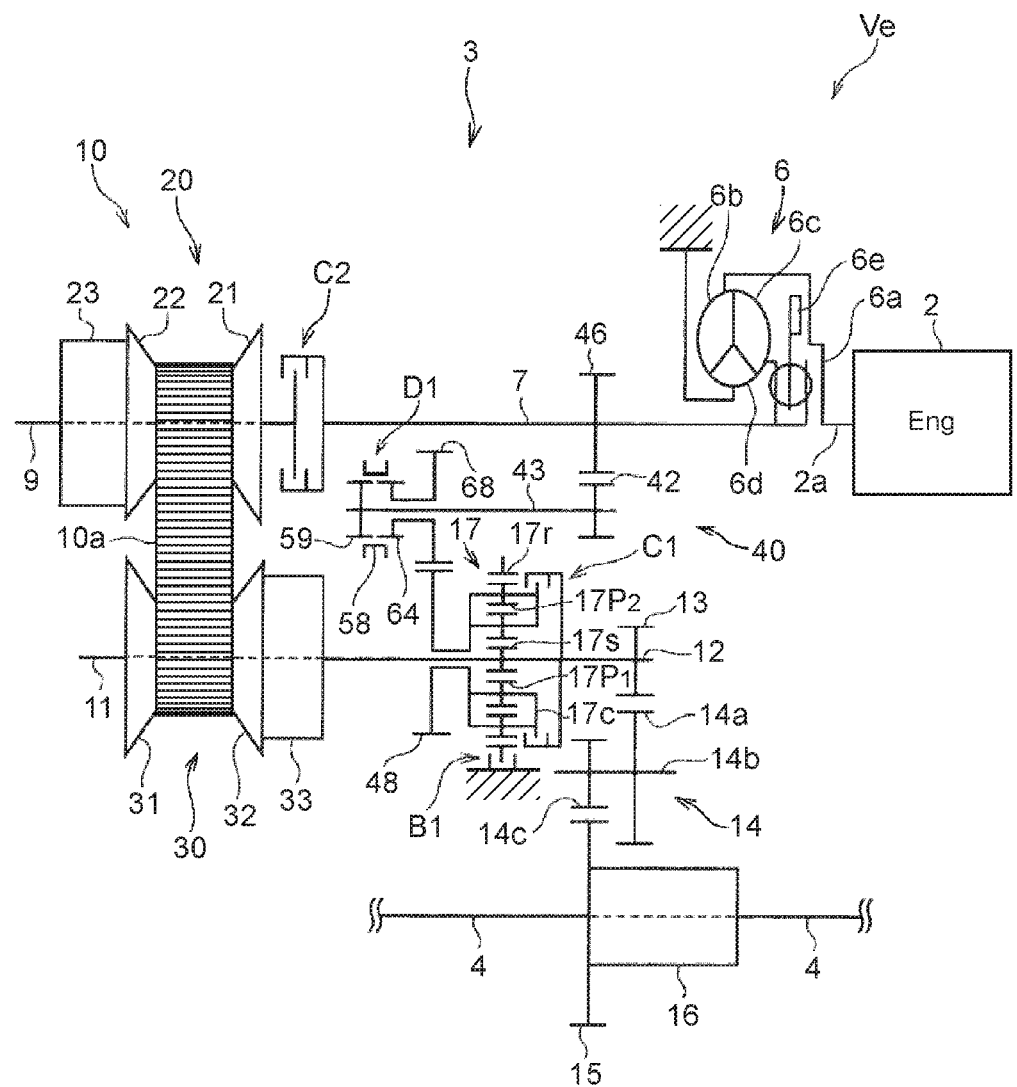
FIG. 19 is a skeletal view that shows a twelfth specified example of the powertrain that can be the target of the invention.

The powertrain in the twelfth specified example shown in FIG. 19 is configured that the rotational shaft on which the second clutch mechanism $C_2$ is arranged differs from that in the eleventh specified example shown in FIG. 18. In the example shown in FIG. 19, the second clutch mechanism $C_2$ is arranged on the same axis as the input shaft 7, the dog clutch $D_1$ is arranged on the counter shaft 43, and the first clutch mechanism $C_1$ and the forward/reverse travel switching mechanism 17 are arranged on the same axis as the output shaft 12. The dog clutch $D_1$ is configured to selectively couple the counter drive gear 68 and the counter shaft 43.

Figure 20:
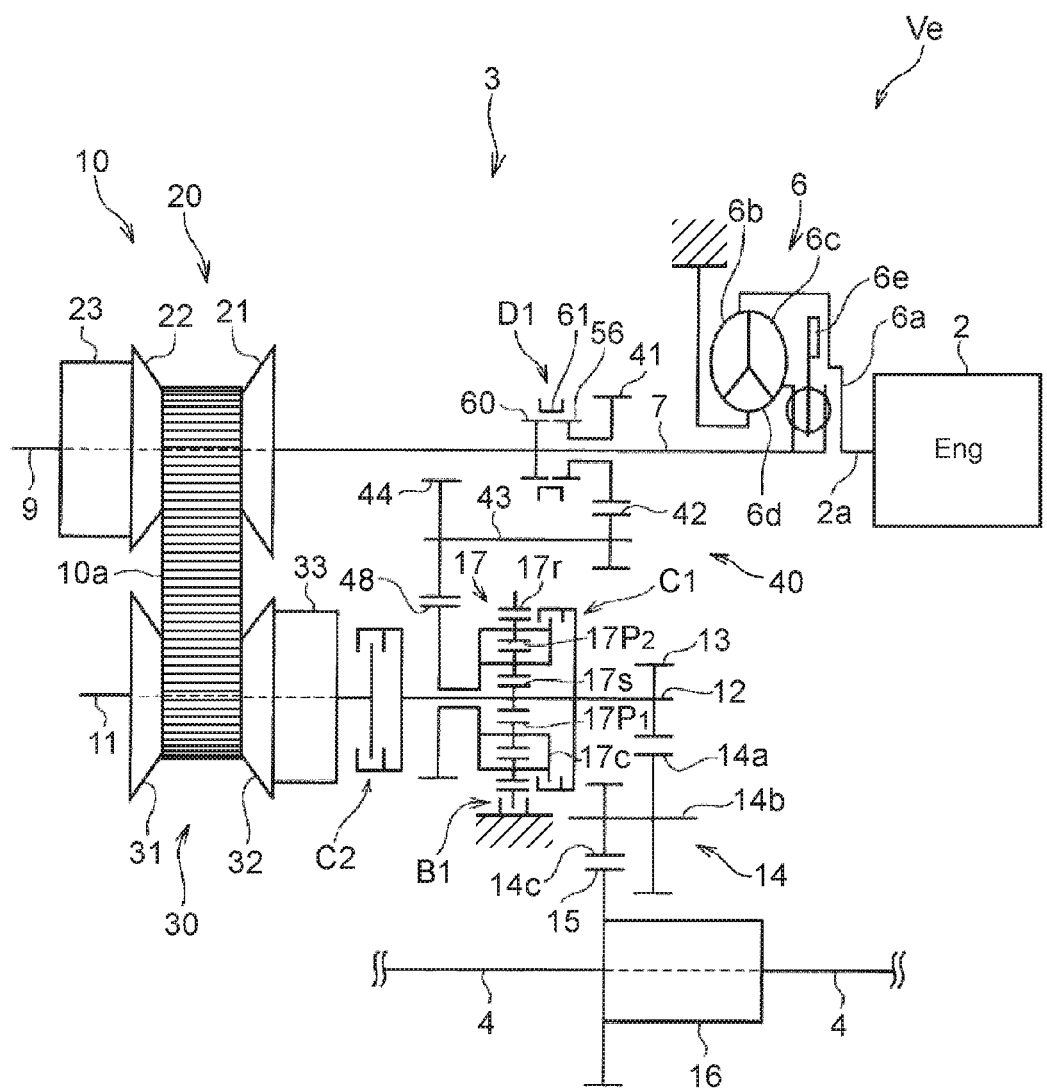
FIG. 20 is a skeletal view that shows a thirteenth specified example of the powertrain that can be the target of the invention.

The powertrain in the thirteenth specified example shown in FIG. 20 is configured that the rotational shaft on which the dog clutch $D_1$ is arranged differs from that in the ninth specified example shown in FIG. 16. In the example shown in FIG. 20, the dog clutch $D_1$ is arranged on the input shaft 7, and the first clutch mechanism $C_1$, the second clutch mechanism $C_2$, and the forward/reverse travel switching mechanism 17 are arranged on the same axis as the output shaft 12. The dog clutch $D_1$ is configured to selectively couple the input shaft 7 and the drive gear 41. The drive gear 41 is fitted to the input shaft 7 in a manner capable of relatively rotating therewith. In addition, the dog clutch $D_1$ is configured to couple the transmission mechanism 40 to the input shaft 7 by meshing a spline that is formed on an inner circumferential surface of a sleeve 61 with a spline that is formed on a clutch gear 60 on the input side and with a spline that is formed on the clutch gear 56 on the output side, the sleeve 61 being able to move in the axial direction of the input shaft 7, the clutch gear 60 being integrated with the input shaft 7, and the clutch gear 56 being integrated with the drive gear 41. Accordingly, in the example shown in FIG. 20, the dog clutch $D_1$ is included in the clutch mechanism that selectively transmits or blocks the torque between the input shaft 7 and the transmission mechanism 40.

Figure 21:
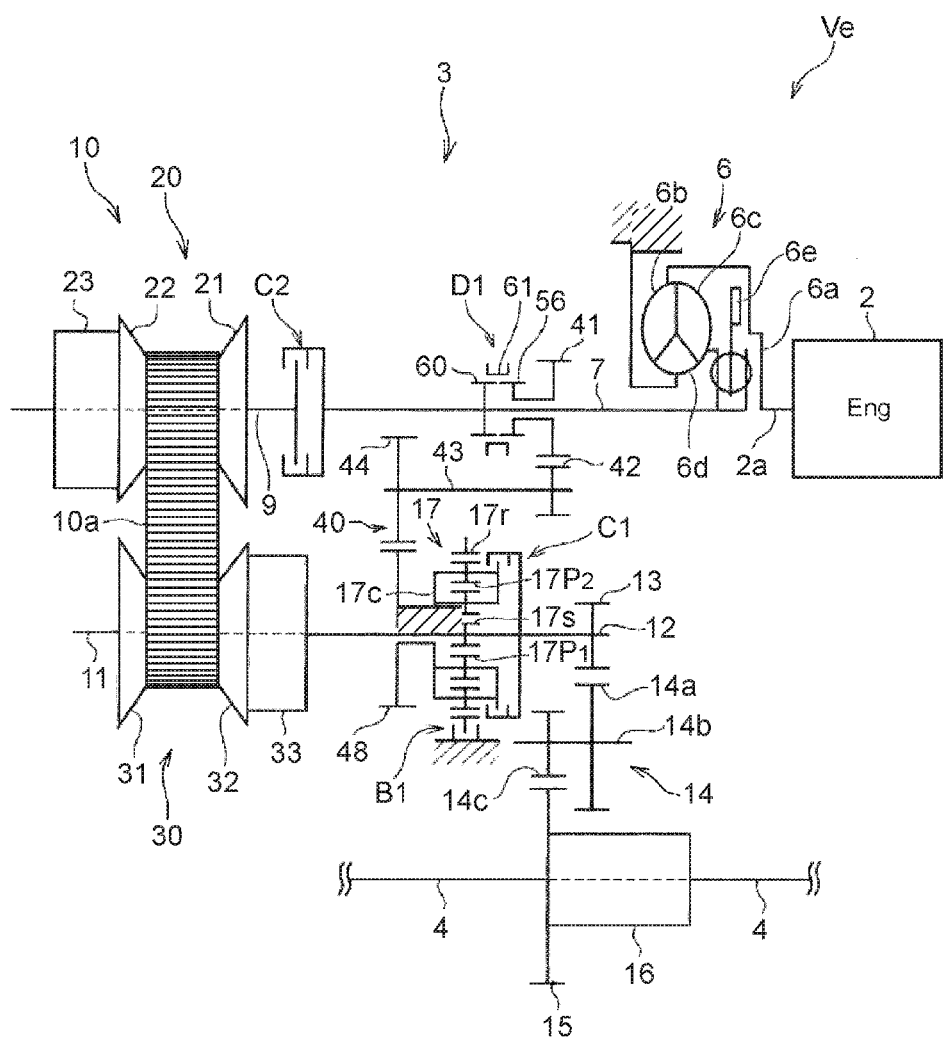
FIG. 21 is a skeletal view that shows a fourteenth specified example of the powertrain that can be the target of the invention.

The powertrain in the fourteenth specified example shown in FIG. 21 is configured that the rotational shaft on which the second clutch mechanism $C_2$ is arranged differs from that in the thirteenth specified example shown in FIG. 20. In the example shown in FIG. 21, the second clutch mechanism $C_2$ and the dog clutch $D_1$ are arranged on the same axis as the input shaft 7, and the first clutch mechanism $C_1$ and the forward/reverse travel switching mechanism 17 are arranged on the output shaft 12. The dog clutch $D_1$ is configured to selectively couple the input shaft 7 and the drive gear 41.

Figure 22:
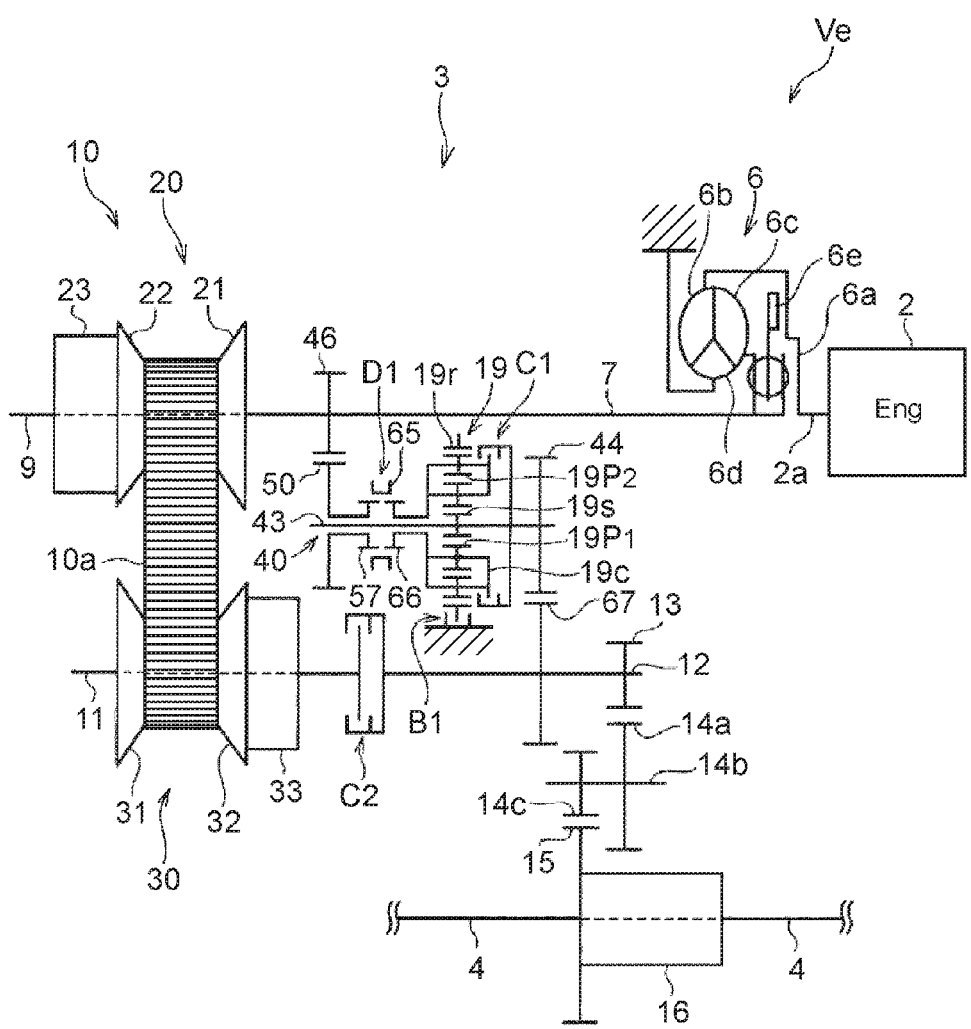
FIG. 22 is a skeletal view that shows a fifteenth specified example of the powertrain that can be the target of the invention.

The powertrain in the fifteenth specified example shown in FIG. 22 is configured that the rotational shaft on which the dog clutch $D_1$ is arranged differs from that in the third specified example shown in FIG. 10. In the example shown in FIG. 22, the first clutch mechanism $C_1$, the dog clutch $D_1$, and the forward/reverse travel switching mechanism 19 are arranged on the counter shaft 43, and the second clutch mechanism $C_2$ is arranged on the same axis as the output shaft 12. The dog clutch $D_1$ is configured to selectively couple a counter driven gear 50 that is formed to be hollow and the carrier 8c. This counter driven gear 50 is fitted to the counter shaft 43 in a manner capable of relatively rotating therewith, and constantly meshes with the drive gear 46 that is integrated with the input shaft 7. More specifically, the dog clutch $D_1$ is configured to couple the forward/reverse travel switching mechanism 19 to the input shaft 7 by meshing a spline that is formed on an inner circumferential surface of a sleeve 65 with a spline that is formed on the clutch gear 57 on the input side and with a spline that is formed on a clutch gear 66 on the output side, the sleeve 65 being able to move in the axial direction of the counter shaft 43, the clutch gear 57 being integrated with the counter driven gear 50, and the clutch gear 66 being integrated with the carrier 19c as the input element. Accordingly, in the example shown in FIG. 22, the dog clutch $D_1$ is included in the clutch mechanism that selectively transmits or blocks the torque between the input shaft 7 and the transmission mechanism 40 via the first gear pair that includes the drive gear 46 and the counter driven gear 50 in the transmission mechanism 40. That is, in this case, in the torque transmission path that stretches from the engine 2 to the drive wheels 5 through the transmission mechanism 40, the dog clutch $D_1$ is arranged on the upstream side, and the first clutch mechanism $C_1$ is arranged on the downstream side.

Figure 23:
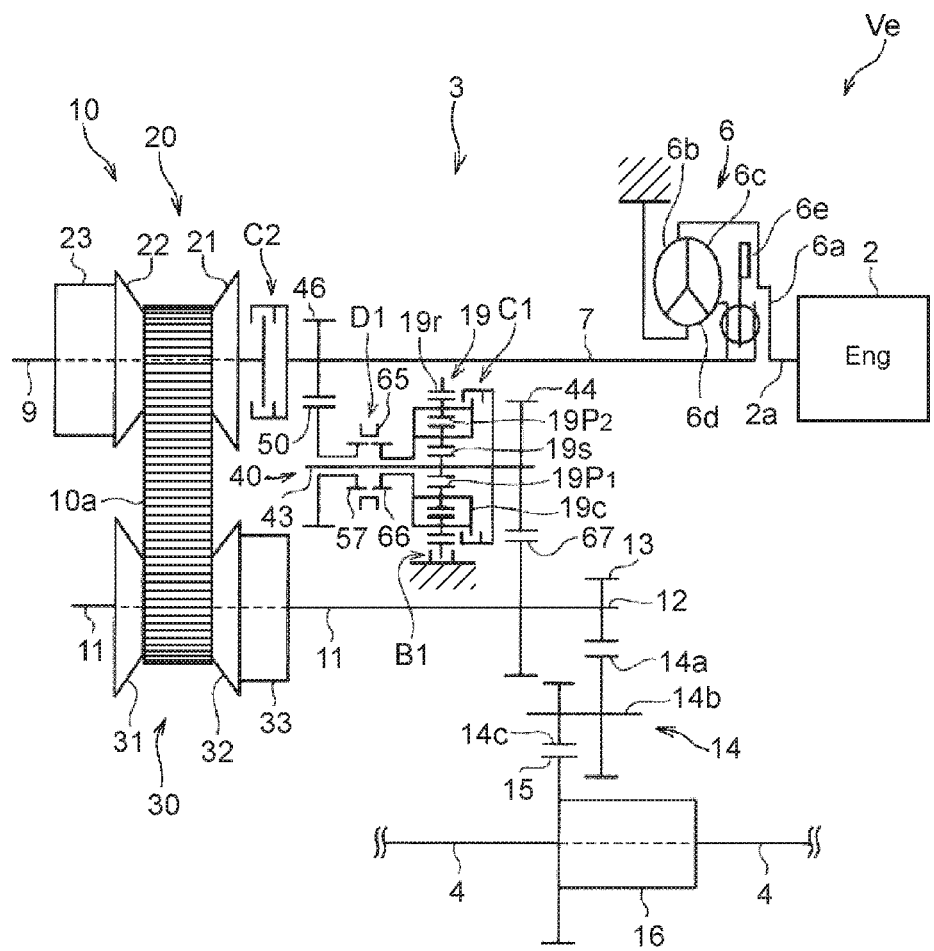
FIG. 23 is a skeletal view that shows a sixteenth specified example of the powertrain that can be the target of the invention.

The powertrain in the sixteenth specified example shown in FIG. 23 is configured that the rotational shaft on which the second clutch mechanism $C_2$ is arranged differs from that in the fifteenth specified example shown in FIG. 22. In the example shown in FIG. 23, the second clutch mechanism $C_2$ is arranged on the same axis as the input shaft 7, and the first clutch mechanism $C_1$, the dog clutch $D_1$, and the forward/reverse travel switching mechanism 19 are arranged on the counter shaft 43. The second clutch mechanism $C_2$ shown in FIG. 23 is configured to have a similar structure to the second clutch mechanism $C_2$ shown in FIG. 9.

Figure 24:
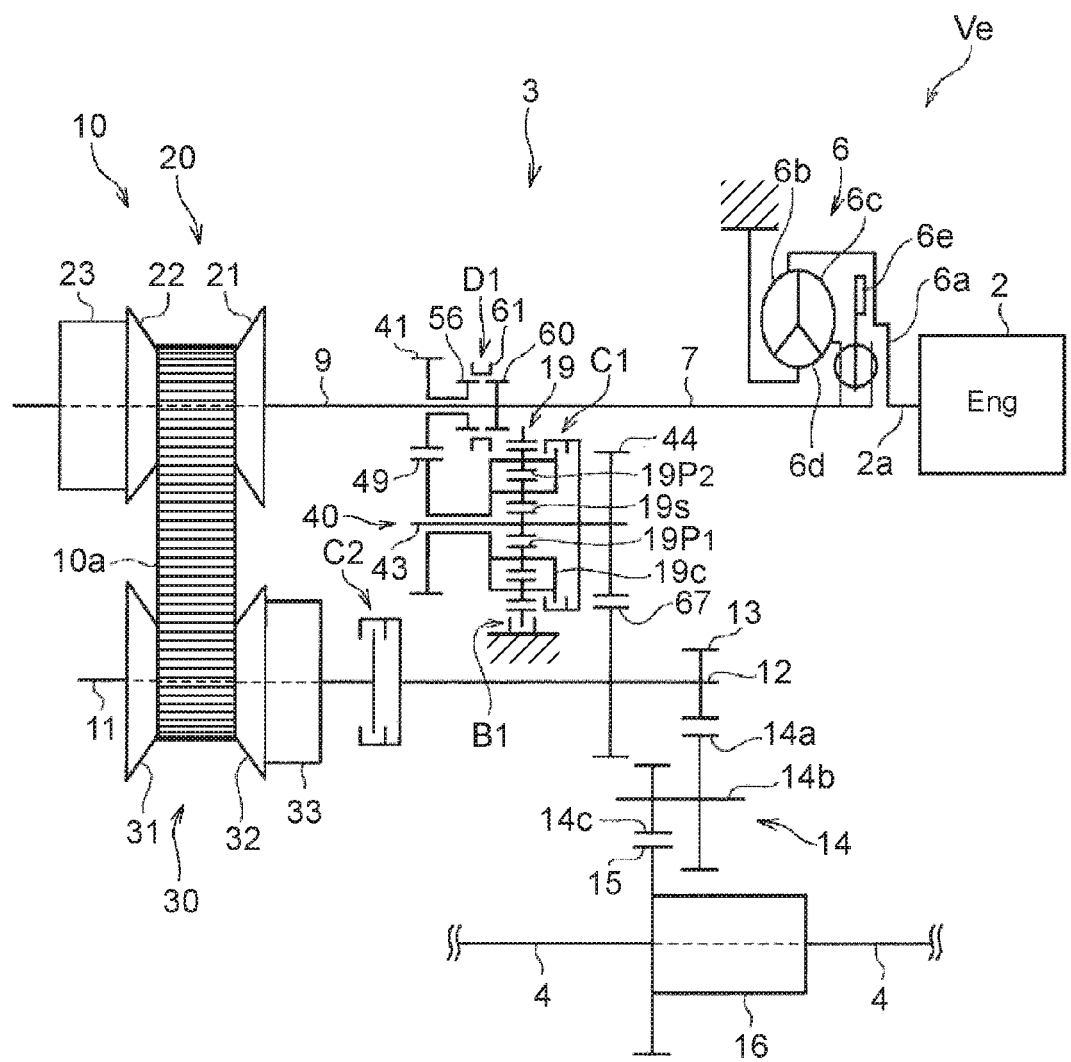
FIG. 24 is a skeletal view that shows a seventeenth specified example of the powertrain that can be the target of the invention.

The powertrain in the seventeenth specified example shown in FIG. 24 is configured that the rotational shaft on which the dog clutch $D_1$ is arranged differs from the third specified example shown in FIG. 10. In the example shown in FIG. 24, the dog clutch $D_1$ is arranged on the input shaft 7, the first clutch mechanism $C_1$ and the forward/reverse travel switching mechanism 19 are arranged on the counter shaft 43, and the second clutch mechanism $C_2$ is arranged on the same axis as the output shaft 12. The dog clutch $D_1$ is configured to have a similar structure to the dog clutch $D_1$ in the fourteenth specified example shown in FIG. 21. In the example shown in FIG. 24, the drive gear 41 that is fitted to the input shaft 7 in a manner capable of relatively rotating therewith and the counter driven gear 49 that is fitted to the counter shaft 43 in a manner capable of relatively rotating therewith constantly mesh with each other. The counter driven gear 49 is integrated with the carrier 19c as the input element of the forward/reverse travel switching mechanism 19.

Figure 25:
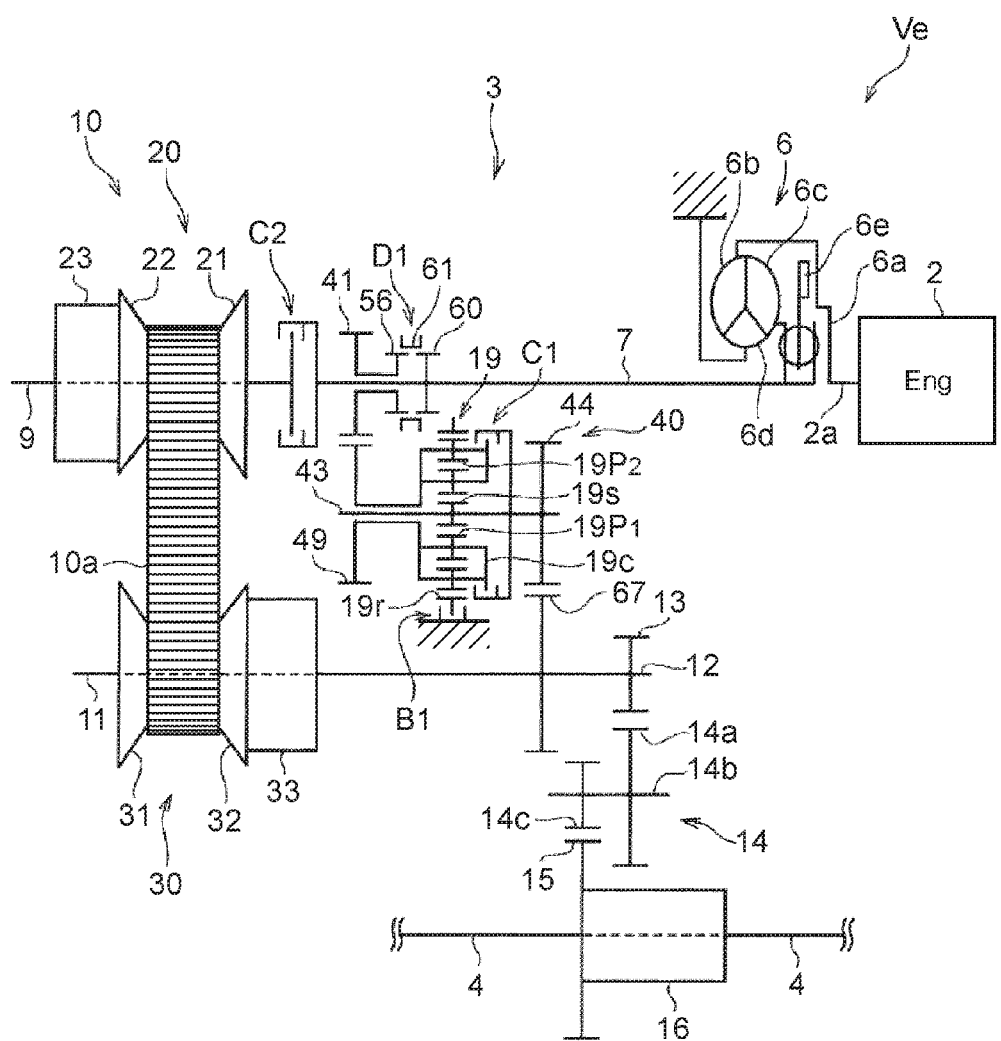
FIG. 25 is a skeletal view that shows an eighteenth specified example of the powertrain that can be the target of the invention.

The powertrain in the eighteenth specified example shown in FIG. 25 is configured that the rotational shaft on which the second clutch mechanism $C_2$ is arranged differs from that in the seventeenth specified example shown in FIG. 24. In the example shown in FIG. 25, the second clutch mechanism $C_2$ and the dog clutch $D_1$ are arranged on the same axis as the input shaft 7, and the first clutch mechanism $C_1$ and the forward/reverse travel switching mechanism 19 are arranged on the counter shaft 43. The second clutch mechanism $C_2$ shown in FIG. 25 is configured to have a similar structure to the second clutch mechanism $C_2$ shown in FIG. 9.

As described above, the powertrain as the target of the invention only needs to be configured that it can select between the first transmission path that transmits the torque from the input shaft to the output shaft via the continuously variable transmission and the second transmission path that transmits the torque from the input shaft to the output shaft via the forward/reverse travel switching mechanism with a differential action and the gear train. Accordingly, for a coupling state among the dog clutch, the input shaft, and the forward/reverse travel switching mechanism that brings the second transmission path into a blocked state where the torque cannot be transmitted, a configuration other than the configuration shown in each of the above-described specified examples can be adopted. Such an example is shown in FIG. 26.

Figure 26:
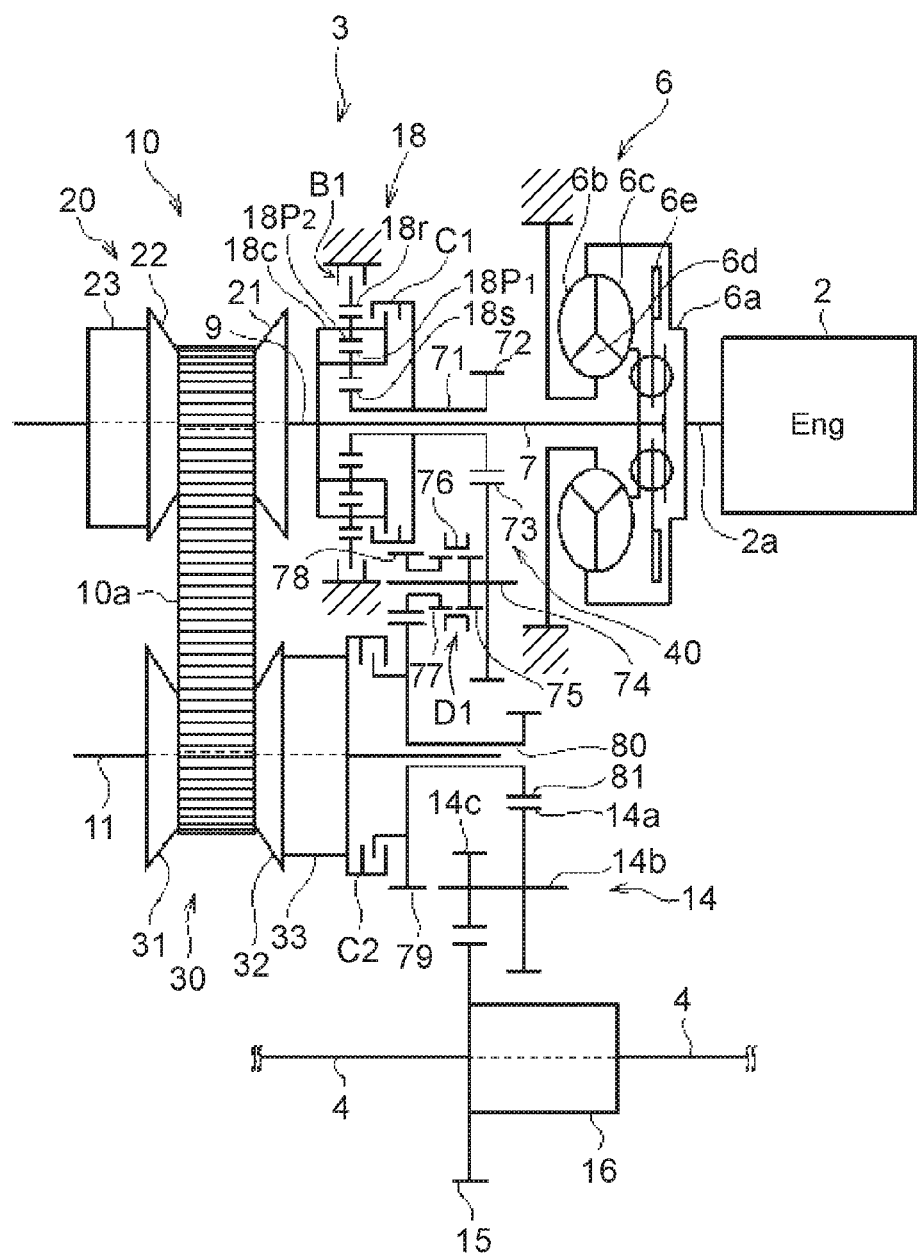
FIG. 26 is a skeletal view that shows a nineteenth specified example of the powertrain that can be the target of the invention.

Differing from each of the above-described specified examples, the input shaft 7 is coupled to the powertrain in the nineteenth specified example shown in FIG. 26, so as to integrally rotate with a carrier 18c in a forward/reverse travel switching mechanism 18. In addition, the dog clutch $D_1$ is configured to be arranged on a counter shaft 74, couple a counter drive gear 78 to the counter shaft 74, and cancel the coupling. In conjunction with such changes of the configuration from each of the above-described specified examples, other appropriate changes are made. Specifically described, the input shaft 7 is coupled so as to integrate and rotate with the primary shaft 9 in the CVT 10, and is also coupled so as to integrate and rotate with the carrier 18c in the planetary gear unit that constitutes the forward/reverse travel switching mechanism 18. Accordingly, in the example shown in FIG. 26, the carrier 18c is the input element. Furthermore, a sun gear shaft 71 as a hollow shaft is integrated with a sun gear 18s, the input shaft 7 penetrates the sun gear shaft 71, and the sun gear shaft 71 and the input shaft 7 are supported so as to be able to rotate relatively. Moreover, the sun gear shaft 71 extends on the engine 2 side (a right side in FIG. 26), and a drive gear 72 is provided on an extended portion of this sun gear shaft 71 so as to integrally rotate therewith.

The first clutch mechanism $C_1$ is arranged between this drive gear 72 and the forward/reverse travel switching mechanism 18. In the example shown in FIG. 26, this first clutch mechanism $C_1$ is configured to couple the sun gear shaft 71 and the carrier 18c and cancel the coupling. It should be noted that the brake mechanism $B_1$ is provided between a ring gear 18r and the fixed section such as the casing. It is configured to stop rotation of the ring gear 18r by this brake mechanism $B_1$ or cancel stop of the rotation of the ring gear 18r. Accordingly, in the configuration shown in FIG. 26, the forward/reverse travel switching mechanism 18 and the first clutch mechanism $C_1$, each of which has a large outer diameter, are arranged adjacent to the primary pulley 20. Thus, an axial length of a portion with a large outer diameter as the powertrain is decreased, and at least the axial length on the input shaft 7 side can be decreased.

The counter shaft 74 that is arranged in parallel with the input shaft 7 and the sun gear shaft 71 is provided with a counter driven gear 73 that meshes with the drive gear 72. This counter driven gear 73 is attached to the counter shaft 74 by a spline (not shown) and the like, so as to integrally rotate therewith. In addition, in the example shown in FIG. 26, the counter driven gear 73 is formed to have a larger diameter than the drive gear 72 such that the speed reducing action is generated. Furthermore, the counter drive gear 78 is attached to the counter shaft 74 in a manner capable of relatively rotating therewith. This counter drive gear 78 is arranged closer to the CVT 10 than the counter driven gear 73, and more specifically, a position thereof is a position on an outer side in a radial direction of the first clutch mechanism $C_1$, for example. The counter drive gear 78 is a gear with a smaller diameter than the counter driven gear 73, and thus avoids alignment of a member with the large outer diameter in the radial direction when being arranged on the outer circumferential side of the first clutch mechanism $C_1$ with the large outer diameter. In this way, an increase in an outer diameter of the entire powertrain can be suppressed, and an increase in the axial length can also be suppressed.

In addition, the dog clutch $D_1$ is arranged on the counter shaft 74 between the counter driven gear 73 and the counter drive gear 78. This dog clutch $D_1$ is configured to couple the counter drive gear 78 to the counter shaft 74 and cancel the coupling. More specifically, the counter shaft 74 and the counter drive gear 78 are coupled by meshing both of a spline that is provided on a hub 75 and a spline that is provided on a clutch gear 77 with a spline that is provided on the sleeve 76, the hub 75 integrally rotating with the counter shaft 74, and the clutch gear 77 integrally rotating with the counter drive gear 78.

In the configuration shown in FIG. 26, an output shaft 80 is constructed of a hollow shaft. The output shaft 80 is rotatably arranged in parallel with the input shaft 7 and the counter shaft 74 and on the same axis as the secondary shaft 11. It should be noted that the secondary shaft 11 is inserted in the output shaft 80 in a manner capable of relatively rotating with the output shaft 80. This output shaft 80 is provided with a driven gear 79 that meshes with the counter drive gear 78 so as to integrally rotate therewith. This driven gear 79 is a gear with a larger diameter than the counter drive gear 78 and generates the speed reducing action in the case where the torque is transmitted from the counter drive gear 78 to the driven gear 79.

The counter drive gear 78 is arranged on the outer circumferential side of the first clutch mechanism $C_1$, and the driven gear 79 meshes with the counter drive gear 78. Thus, the driven gear 79 is arranged adjacent to the secondary pulley 30. In addition, the second clutch mechanism $C_2$ is arranged between this secondary pulley 30 and the driven gear 79. The second clutch mechanism $C_2$ is used to allow the torque transmission path that includes the CVT 10 to transmit the torque, and is configured to couple the output shaft 80 to the secondary pulley 30 or the secondary shaft 11 and cancel the coupling. As schematically shown in FIG. 26, for example, the second clutch mechanism $C_2$ can be configured to couple one of the sheaves that constitute the secondary pulley 30 (particularly, a drum for forming a hydraulic chamber in a thrust application mechanism 33) and the driven gear 79 and cancel the coupling.

In the configuration shown in FIG. 26, in correspondence to the alignment of the pulleys 20, 30 with large diameters in the radial direction, the forward/reverse travel switching mechanism 18 and the first clutch mechanism $C_1$, each of which has the large diameter, as well as the second clutch mechanism $C_2$ and the driven gear 79 are substantially aligned in the radial direction. Accordingly, the members with the large diameters can collectively be arranged on one end side in the axial direction. In conjunction with this, an outer shape of an entire power transmitting apparatus can be a shape in which an axial length of a large diameter portion is relatively short, and, in conjunction with this, mountability can be improved.

The output shaft 80 as a cylindrical shaft is configured to extend in an opposite direction of the secondary pulley 30 from the driven gear 79, is configured that an output gear 81 is provided on an extended portion thereof, and is configured to transmit the torque from this output gear 81 to the front differential 16 via the large diameter gear 14a and the speed reduction gear shaft 14b and via the small diameter gear 14c and the ring gear 15. A configuration of a torque transmission path that stretches from this output gear 81 to the front differential 16 is similar to a configuration in each of the above-described specified examples. It should be noted that, in FIG. 26, similar components in the configuration that is not particularly described to those in each of the above-described specified examples are denoted by the same reference numerals in FIG. 26 as those in each of the above-described specified examples.

Similar to the powertrain of each of the above-described specified examples, the powertrain that is configured as shown in FIG. 26 can set the forward travel state and the specified transmission gear ratio as well as the reverse travel state by engaging or disengaging each of the clutch mechanisms $C_1$, $C_2$, $D_1$ and the brake mechanism $B_1$ as shown in FIG. 3. That is, the torque can be transmitted from the input shaft 7 to the output shaft 80 via the transmission mechanism 40 by engaging the first clutch mechanism $C_1$ and the dog clutch $D_1$. Since the gear ratio of the transmission mechanism 40 is higher than the maximum transmission gear ratio in the CVT 10, drive torque at a startup can be increased.

In addition, in the nineteenth specified example shown in FIG. 26, the torque is transmitted from the input shaft 7 to the output shaft 80 via the CVT 10 by engaging the second clutch mechanism $C_2$ only. The transmission gear ratio at this time is changed by appropriately changing the winding radius of the belt 10a with respect to each of the pulleys 20, 30 in the CVT 10. In this case, the torque is transmitted from the driven gear 79 that is integrated with the output shaft 80 to the counter drive gear 78 that meshes with the driven gear 79. However, since the dog clutch $D_1$ is disengaged and the torque transmission between the counter shaft 74 and the counter drive gear 78 is blocked, the torque is not transmitted from the counter shaft 74 to the output shaft 80 side. In particular, in the case where the transmission mechanism 40 is configured as a speed reduction gear train, the transmission mechanism 40 functions as a speed increase gear train when the torque is input thereto from the output shaft 80 side. Accordingly, a rotational speed of the counter drive gear 78 becomes higher than a rotational speed of the driven gear 79. However, since the dog clutch $D_1$ is disengaged, the torque is not transmitted to the counter shaft 74 from the output shaft 80 side. Thus, a rotational speed of the counter shaft 74 does not become high. As a result, in the configuration shown in FIG. 26, it is possible to prevent the rotational speed of the counter shaft 74 from becoming high in the case where the forward travel is made by using the CVT 10. Thus, power loss in a bearing portion that rotatably supports the counter shaft 74 can be reduced, and furthermore, power transmission efficiency of the entire power transmitting apparatus can be improved. Moreover, the bearing that rotatably supports the counter shaft 74 does not have to be a particularly high-quality, high-cost bearing that can endure the high rotational speed. As a result, a configuration of the entire power transmitting apparatus can be downsized, and cost thereof can be decreased.

It should be noted that the first clutch mechanism $C_1$ may be engaged in the case where the forward travel is made by transmitting the torque from the input shaft 7 to the output shaft 80 via the CVT 10. In this case, the torque is transmitted to the counter shaft 74 via the drive gear 72 and the counter driven gear 73 that meshes therewith, so as to rotate the counter shaft 74. However, the speed reducing action is generated between the drive gear 72 and the counter driven gear 73, and thus the rotational speed of the counter shaft 74 becomes a lower rotational speed than the input shaft 7. Thus, necessity to provide the high-quality and large bearing that rotatably supports the counter shaft 74 is not particularly raised.

In addition, similar to each of the above-described specified examples, the reverse travel state in the configuration shown in FIG. 26 is set by engaging the brake mechanism $B_1$ and the dog clutch $D_1$. That is, the ring gear 18r as the reaction element of the forward/reverse travel switching mechanism 18 is fixed, and the torque is input to the carrier 18c as the input element. In this way, the sun gear 18s as the output element is rotated in the opposite direction with respect to the carrier 18c, and the torque is further transmitted from the sun gear 18s to the output shaft 80 via the transmission mechanism 40 and the dog clutch $D_1$. In this case, differing from each of the above-described specified examples, the carrier 18c serves as the input element, and the sun gear 18s serves as the output element in the configuration shown in FIG. 26. Thus, the transmission gear ratio that is generated in the forward/reverse travel switching mechanism 18 in the reverse travel state differs from the transmission gear ratio in each of the above-described specified examples. That is, when a gear ratio (a ratio of the number of tooth of the sun gear 18s to the number of tooth of the ring gear 18r) of the planetary gear unit that constitutes the forward/reverse travel switching mechanism 18 is set as "ρ", the transmission gear ratio by the forward/reverse travel switching mechanism 18 in the reverse travel state becomes "(1−ρ)/ρ" in the configuration shown in FIG. 26. Meanwhile, in each of the above-described specified examples, the transmission gear ratio by the forward/reverse travel switching mechanism 18 in the reverse travel state becomes "ρ/(1−ρ)".

As described above, also in each of the above-described modified examples of the powertrain, the clutch that is arranged on the relatively downstream side among the clutch mechanisms arranged in series in the transmission path including the transmission mechanism is engaged, and the transmission mechanism can thereby be joined as the rotational inertia body to the torque transmission path during the CVT travel. In this way, the vibration that is originated from the engine and is transmitted to the torque transmission path can be dampened. That is, the clutch that is arranged on the downstream side may be a meshing-type clutch mechanism or may be a friction-type clutch mechanism.

Here, a relationship between the configuration in each of the above-described specified examples and the configuration in the invention will be described. In the powertrain in the first specified example that has been described with reference to FIG. 2, the first clutch mechanism $C_1$ that is arranged on the relatively upstream side corresponds to the one clutch in the invention, and the dog clutch $D_1$ that is arranged on the relatively downstream side corresponds to the other clutch in the invention. Furthermore, the first clutch mechanism $C_1$ in the second to eighth specified examples that has been described with reference to FIG. 9 to FIG. 15 corresponds to the one clutch in the invention, and the dog clutch $D_1$ corresponds to the other clutch in the invention. Moreover, in the powertrain in the ninth to eighteenth specified examples that has been described with reference to FIG. 16 to FIG. 25, the dog clutch $D_1$ that is arranged on the relatively upstream side corresponds to the one clutch in the invention, and the first clutch mechanism $C_1$ that is arranged on the relatively downstream side corresponds to the other clutch in the invention. In addition, in the powertrain in the nineteenth specified example that has been described with reference to FIG. 26, the first clutch mechanism $C_1$ that is arranged on the relatively upstream side corresponds to the one clutch in the invention, and the dog clutch $D_1$ that is arranged on the relatively downstream side corresponds to the other clutch in the invention. That is, in each of the specified examples, the clutch mechanism that is arranged on the relatively upstream side among the clutch mechanisms arranged in series in the transmission path including the transmission mechanism 40 corresponds to the one clutch mechanism in the invention, and the clutch mechanism arranged on the relatively downstream side corresponds to the other clutch mechanism of the invention.

It should be noted that the control device for a vehicle according to the invention is not limited to the above-described specified examples but appropriate modifications can be made thereto within the scope that does not depart from the purpose of the invention.

For example, the above-described ECU may be configured to control driving of the engine. More specifically, the engine may be subjected to drive control by the ECU, such as fuel injection control, ignition control, and intake air amount adjustment control. For example, in the case where the fuel economy is emphasized in the travel, the engine speed and the engine torque are individually controlled. In addition, in the case where the engine is a gasoline engine, an intake air amount is controlled by controlling actuation of an unillustrated electronic throttle valve, and the engine torque is thereby controlled. Meanwhile, in the case where the engine is a diesel engine, the engine torque is controlled by a fuel injection amount.

Furthermore, the meshing-type clutch mechanism in the invention may be constructed of a synchromesh mechanism of a key type or a synchromesh mechanism of a cone type, such as a synchromesh mechanism of a single-cone type or a synchromesh mechanism of a multi-cone type.

Moreover, the transmission mechanism in the invention is not limited to a gear mechanism that has one transmission gear ratio (one gear ratio) as the fixed transmission gear ratio but may be a gear mechanism that has two or more of the fixed transmission gear ratios (the gear ratios) and can select and set any of those fixed transmission gear ratios. That is, the transmission mechanism only needs to be constructed of the gear mechanism that can transmit the torque from the input shaft to the output shaft. However, in the invention, since the transmission mechanism sets the transmission gear ratio that cannot be set by the continuously variable transmission as the fixed transmission gear ratio, the gear mechanism is configured by combinations of gear pairs in which plural gears mesh with each other. That is, it only has to be configured that any of those gear ratios (the ratios of the number of tooth) becomes a higher transmission gear ratio than the maximum transmission gear ratio that can be set by the continuously variable transmission.

DESCRIPTION OF THE REFERENCE NUMERALS

1/ ELECTRONIC CONTROL UNIT (ECU)
2/ ENGINE
3/ TRANSAXLE
4/ DRIVE SHAFT
5/ DRIVE WHEEL
7/ INPUT SHAFT
8/ FORWARD/REVERSE TRAVEL SWITCHING MECHANISM
9/ PRIMARY SHAFT
10/ CONTINUOUSLY VARIABLE TRANSMISSION (CVT)
10a/ BELT
11/ SECONDARY SHAFT
12/ OUTPUT SHAFT
13/ OUTPUT GEAR
14/ SPEED REDUCTION GEAR MECHANISM
16/ FRONT DIFFERENTIAL
20/ PRIMARY PULLEY
30/ SECONDARY PULLEY
40/ TRANSMISSION MECHANISM
41/ DRIVE GEAR
42/ COUNTER DRIVEN GEAR
43/ COUNTER SHAFT
44/ COUNTER DRIVE GEAR
45/ DRIVEN GEAR
A/ PATH SWITCHING MECHANISM
$B_1$/ BRAKE MECHANISM
$C_1$/ FIRST CLUTCH MECHANISM
$C_2$/ SECOND CLUTCH MECHANISM
$D_1$/ MESHING-TYPE CLUTCH MECHANISM (DOG CLUTCH)

What is claimed is:

1. A control device for a vehicle, the vehicle including:
an input shaft to which torque output by an internal combustion engine is transmitted;
an output shaft for outputting the torque to drive wheels;
a continuously variable transmission;
a transmission mechanism; and
a clutch mechanism,
the continuously variable transmission, the transmission mechanism, and the clutch mechanism being provided between the input shaft and the output shaft,
the clutch mechanism being configured to selectively switch between a first transmission path and a second transmission path, the first transmission path transmitting the torque from the internal combustion engine to the drive wheels via the continuously variable transmission, and the second transmission path transmitting the torque from the internal combustion engine to the drive wheels via the transmission mechanism,
the clutch mechanism including one clutch and the other clutch, the other clutch being provided in series with respect to the one clutch, the other clutch being provided closer to an output shaft side of the control device than the one clutch, the clutch mechanism configured such that transmission of the torque in a forward direction to the drive wheels via the transmission mechanism is blocked in the case where at least either one of the one clutch and the other clutch is disengaged, the control device comprising
an electronic control unit configured to engage to other clutch in accordance with an operation state of the vehicle in case where the torque is transmitted from the internal combustion engine to the drive wheels via the continuously variable transmission,
wherein the transmission mechanism includes a speed reduction mechanism that has a gear train, and
wherein a transmission gear ratio by the transmission mechanism is higher than a maximum transmission gear ratio that can be set by the continuously variable transmission.

2. The control device according to claim 1 wherein
the electronic control unit is configured to engage the other clutch in the case where the torque is transmitted from the internal combustion engine to the drive wheels via the continuously variable transmission and a speed of the internal combustion engine is at most equal to a specified speed.

3. The control device according to claim 1 wherein
the electronic control unit is configured to engage the other clutch in the case where the torque is transmitted from the internal combustion engine to the drive wheels via the continuously variable transmission and the output torque of the internal combustion engine is at least equal to a specified torque.

4. The control device according to claim 1 wherein
the electronic control unit is configured to engage the other clutch in the case where the torque is transmitted from the internal combustion engine to the drive wheels via the continuously variable transmission and a throttle opening degree is at least equal to a specified throttle opening degree.

5. The control device according to claim 1 wherein
the electronic control unit is configured to engage the other clutch in case where the torque is transmitted from the internal combustion engine to the drive wheels via the continuously variable transmission and a transmission gear ratio by the continuously variable transmission is at most equal to a specified transmission gear ratio.

6. The control device according to claim 1 wherein
the electronic control unit is configured to engage the other clutch in the case where the torque is transmitted from the internal combustion engine to the drive wheels via the continuously variable transmission and a vehicle speed is at most equal to a specified vehicle speed.

7. The control device according to claim 1 wherein
the vehicle further includes a forward/reverse travel switching mechanism for switching a rotational direction of the torque that is input from the input shaft in a transmission path that includes the transmission mechanism between the input shaft and the output shaft, and
the forward/reverse travel switching mechanism includes a planetary gear unit that has plural rotation elements.

8. The control device according to claim 7 wherein
the transmission mechanism includes a counter shaft that is provided in parallel with the input shaft and the output shaft,
the forward/reverse travel switching mechanism is arranged on a rotational shaft comprising one of the input shaft and the counter shaft, and
the one clutch is configured to be arranged on the rotational shaft, on which the forward/reverse travel switching mechanism is arranged, and selectively couple one of the plural rotation elements that integrally rotates with the rotational shaft and an other rotation element among the plural rotation elements.

9. The control device according to claim 1 wherein
the one clutch includes a friction clutch, and
the other clutch includes a meshing-type clutch.

* * * * *